United States Patent
Higgins et al.

(10) Patent No.: US 11,310,256 B2
(45) Date of Patent: Apr. 19, 2022

(54) MONITORING ENCRYPTED NETWORK TRAFFIC

(71) Applicant: ExtraHop Networks, Inc., Seattle, WA (US)

(72) Inventors: Benjamin Thomas Higgins, Shoreline, WA (US); Jeff James Costlow, Kingston, WA (US); John Gemignani, Jr., Bremerton, WA (US); Michael Kerber Krause Montague, Lake Forest Park, WA (US); Eric James Rongo, Seattle, WA (US); Xue Jun Wu, Seattle, WA (US)

(73) Assignee: ExtraHop Networks, Inc., Seattle, WA (US)

( * ) Notice: Subject to any disclaimer, the term of this patent is extended or adjusted under 35 U.S.C. 154(b) by 0 days.

(21) Appl. No.: 17/483,148

(22) Filed: Sep. 23, 2021

(65) Prior Publication Data

US 2022/0094706 A1    Mar. 24, 2022

Related U.S. Application Data

(60) Provisional application No. 63/082,262, filed on Sep. 23, 2020.

(51) Int. Cl.
    *H04L 29/06*      (2006.01)
    *H04L 43/0876*      (2022.01)
    (Continued)

(52) U.S. Cl.
    CPC ........ *H04L 63/1425* (2013.01); *H04L 9/0819* (2013.01); *H04L 43/062* (2013.01);
    (Continued)

(58) Field of Classification Search
    CPC ............ H04L 63/1425; H04L 63/0209; H04L 63/0428; H04L 63/0807; H04L 63/0869;
    (Continued)

(56) References Cited

U.S. PATENT DOCUMENTS

| 5,027,269 A | 6/1991 | Grant et al. |
| 5,430,727 A | 7/1995 | Callon |

(Continued)

FOREIGN PATENT DOCUMENTS

| CN | 105071987 A | 11/2015 |
| CN | 106170008 A | 11/2016 |

(Continued)

OTHER PUBLICATIONS

Office Communication for U.S. Appl. No. 13/831,673 dated Sep. 30, 2013, pp. 1-10.

(Continued)

*Primary Examiner* — Vance M Little
(74) *Attorney, Agent, or Firm* — John W. Branch; Branch Partners PLLC

(57) ABSTRACT

Embodiments are directed to monitoring network traffic using network monitoring computers (NMCs). Networks may be configured to protect servers using centralized security protocols. Centralized security protocols may depend on centralized control provided by authentication control servers. If a client intends to access protected servers it may communicate with the authentication control server to obtain keys that enable it to access the requested servers. NMCs may monitor network traffic the centralized security protocol to collect metrics associated with the control servers, clients, or resource servers.

28 Claims, 12 Drawing Sheets

(51) Int. Cl.
*H04L 43/062* (2022.01)
*H04L 9/08* (2006.01)

(52) U.S. Cl.
CPC ...... *H04L 43/0876* (2013.01); *H04L 63/0209* (2013.01); *H04L 63/0428* (2013.01); *H04L 63/0807* (2013.01); *H04L 63/0869* (2013.01)

(58) Field of Classification Search
CPC .. H04L 9/0819; H04L 43/062; H04L 43/0876
See application file for complete search history.

(56) References Cited

U.S. PATENT DOCUMENTS

| | | | |
|---|---|---|---|
| 5,541,995 | A | 7/1996 | Normile et al. |
| 5,548,646 | A | 8/1996 | Aziz et al. |
| 5,715,464 | A | 2/1998 | Crump et al. |
| 5,787,237 | A | 7/1998 | Reilly |
| 5,802,599 | A | 9/1998 | Cabrera et al. |
| 5,835,726 | A | 11/1998 | Shwed et al. |
| 5,857,188 | A | 1/1999 | Douglas |
| 5,928,363 | A | 7/1999 | Ruvolo |
| 6,058,429 | A | 5/2000 | Ames et al. |
| 6,141,686 | A | 10/2000 | Jackowski et al. |
| 6,263,049 | B1 | 7/2001 | Kuhn |
| 6,321,338 | B1 | 11/2001 | Porras et al. |
| 6,385,729 | B1 | 5/2002 | DiGiorgio et al. |
| 6,401,150 | B1 | 6/2002 | Reilly |
| 6,405,250 | B1 | 6/2002 | Lin et al. |
| 6,412,000 | B1 | 6/2002 | Riddle et al. |
| 6,526,044 | B1 | 2/2003 | Cookmeyer, II et al. |
| 6,560,636 | B2 | 5/2003 | Cohen et al. |
| 6,636,838 | B1 | 10/2003 | Perlman et al. |
| 6,704,311 | B1 | 3/2004 | Chuah et al. |
| 6,704,874 | B1 | 3/2004 | Porras et al. |
| 6,765,909 | B1 | 7/2004 | Sen et al. |
| 6,807,156 | B1 | 10/2004 | Veres et al. |
| 6,807,565 | B1 | 10/2004 | Dodrill et al. |
| 6,883,015 | B1 | 4/2005 | Geen et al. |
| 6,901,517 | B1 | 5/2005 | Redmore |
| 6,944,599 | B1 | 9/2005 | Vogel et al. |
| 6,948,060 | B1 | 9/2005 | Ramanathan |
| 6,968,554 | B1 | 11/2005 | Macdonald et al. |
| 6,999,729 | B2 | 2/2006 | Wandel |
| 7,042,888 | B2 | 5/2006 | Berggreen |
| 7,047,303 | B2 | 5/2006 | Lingafelt et al. |
| 7,089,326 | B2 | 8/2006 | Boucher et al. |
| RE39,360 | E | 10/2006 | Aziz et al. |
| 7,133,365 | B2 | 11/2006 | Klinker et al. |
| 7,143,153 | B1 | 11/2006 | Black et al. |
| 7,177,930 | B1 | 2/2007 | LoPresti |
| 7,181,769 | B1 | 2/2007 | Keanini et al. |
| 7,193,968 | B1 | 3/2007 | Kapoor et al. |
| 7,313,141 | B2 | 12/2007 | Kan et al. |
| 7,424,532 | B1 | 9/2008 | Subbiah |
| 7,454,499 | B2 | 11/2008 | Cantrell et al. |
| 7,457,870 | B1 | 11/2008 | Lownsbrough et al. |
| 7,474,654 | B2 | 1/2009 | Guru |
| 7,480,292 | B2 | 1/2009 | Busi et al. |
| 7,509,680 | B1 | 3/2009 | Sallam |
| 7,535,906 | B2 | 5/2009 | Engbersen et al. |
| 7,543,146 | B1 | 6/2009 | Karandikar et al. |
| 7,545,499 | B2 | 6/2009 | Overbeck et al. |
| 7,554,983 | B1 | 6/2009 | Muppala |
| 7,580,356 | B1 | 8/2009 | Mishra et al. |
| 7,602,731 | B2 | 10/2009 | Jain |
| 7,606,706 | B1 | 10/2009 | Rubin et al. |
| 7,609,630 | B2 | 10/2009 | Gobeil |
| 7,594,273 | B2 | 11/2009 | Keanini et al. |
| 7,619,988 | B2 | 11/2009 | Shimada et al. |
| 7,620,986 | B1 | 11/2009 | Jagannathan et al. |
| 7,639,613 | B1 | 12/2009 | Ghannadian et al. |
| 7,644,150 | B1 | 1/2010 | Nucci et al. |
| 7,660,883 | B2 | 2/2010 | Fowlow |
| 7,724,905 | B2 | 5/2010 | Bleumer et al. |
| 7,739,497 | B1 | 6/2010 | Fink et al. |
| 7,774,456 | B1 | 8/2010 | Lownsbrough et al. |
| 7,809,829 | B2 | 10/2010 | Kelly et al. |
| 7,810,151 | B1 | 10/2010 | Guruswamy |
| 7,817,549 | B1 | 10/2010 | Kasralikar et al. |
| 7,849,502 | B1 | 12/2010 | Bloch et al. |
| 7,864,764 | B1 | 1/2011 | Ma et al. |
| 7,916,652 | B1 | 3/2011 | Lima et al. |
| 7,936,682 | B2 | 5/2011 | Singh et al. |
| 7,937,755 | B1 | 5/2011 | Guruswamy |
| 7,944,822 | B1 | 5/2011 | Nucci et al. |
| 7,975,139 | B2 | 7/2011 | Coulier |
| 7,979,555 | B2 | 7/2011 | Rothstein et al. |
| 7,979,694 | B2 | 7/2011 | Touitou et al. |
| 8,040,798 | B2 | 10/2011 | Chandra et al. |
| 8,079,083 | B1 | 12/2011 | Bennett et al. |
| 8,102,783 | B1 | 1/2012 | Narayanaswamy et al. |
| 8,107,397 | B1 | 1/2012 | Bagchi et al. |
| 8,125,908 | B2 | 2/2012 | Rothstein et al. |
| 8,185,953 | B2 | 5/2012 | Rothstein et al. |
| 8,352,725 | B1 | 1/2013 | O'Toole, Jr. |
| 8,411,677 | B1 | 4/2013 | Colloff |
| 8,418,249 | B1 | 4/2013 | Nucci et al. |
| 8,457,127 | B2 | 6/2013 | Eastham et al. |
| 8,494,985 | B1 | 7/2013 | Keralapura et al. |
| 8,533,254 | B1 | 9/2013 | Whitson, Jr. et al. |
| 8,555,383 | B1 | 10/2013 | Marhsall et al. |
| 8,578,024 | B1 | 11/2013 | Keralapura et al. |
| 8,619,579 | B1 | 12/2013 | Rothstein et al. |
| 8,627,422 | B2 | 1/2014 | Hawkes et al. |
| 8,635,441 | B2 | 1/2014 | Frenkel et al. |
| 8,707,440 | B2 | 4/2014 | Gula et al. |
| 8,744,894 | B2 | 6/2014 | Christiansen et al. |
| 8,782,393 | B1 | 7/2014 | Rothstein et al. |
| 8,817,655 | B2 | 8/2014 | Szabo et al. |
| 8,843,627 | B1 | 9/2014 | Baldi et al. |
| 8,848,744 | B1 | 9/2014 | Rothstein et al. |
| 8,861,397 | B2 | 10/2014 | Kind et al. |
| 8,964,548 | B1 | 2/2015 | Keralapura et al. |
| 8,971,196 | B2 | 3/2015 | Degioanni et al. |
| 9,026,467 | B2 | 5/2015 | Bammi et al. |
| 9,036,493 | B2 | 5/2015 | Degioanni et al. |
| 9,049,216 | B2 | 6/2015 | McCanne et al. |
| 9,083,740 | B1 | 7/2015 | Ma et al. |
| 9,094,288 | B1 | 7/2015 | Nucci et al. |
| 9,158,604 | B1 | 10/2015 | Christodorescu et al. |
| 9,176,838 | B2 | 11/2015 | Li et al. |
| 9,183,573 | B2 | 11/2015 | Tseng |
| 9,189,318 | B2 | 11/2015 | Li et al. |
| 9,191,400 | B1 | 11/2015 | Ptasinski et al. |
| 9,203,865 | B2 | 12/2015 | Linden et al. |
| 9,264,288 | B1 | 2/2016 | Arora et al. |
| 9,338,147 | B1 | 5/2016 | Rothstein et al. |
| 9,357,410 | B2 | 5/2016 | Nedeltchev et al. |
| 9,380,489 | B2 | 6/2016 | Kotecha et al. |
| 9,391,866 | B1 | 7/2016 | Martin et al. |
| 9,400,871 | B1 | 7/2016 | Hewinson |
| 9,401,925 | B1 | 7/2016 | Guo et al. |
| 9,426,036 | B1 | 8/2016 | Roy |
| 9,430,646 | B1 | 8/2016 | Mushtaq et al. |
| 9,432,430 | B1 | 8/2016 | Klenz |
| 9,461,875 | B2 | 10/2016 | Groat et al. |
| 9,479,405 | B1 | 10/2016 | Tongaonkar et al. |
| 9,483,742 | B1 | 11/2016 | Ahmed |
| 9,516,053 | B1 | 12/2016 | Muddu |
| 9,531,736 | B1 | 12/2016 | Torres et al. |
| 9,565,202 | B1 | 2/2017 | Kindlund et al. |
| 9,591,015 | B1 | 3/2017 | Amin et al. |
| 9,621,523 | B2 | 4/2017 | Rothstein et al. |
| 9,654,503 | B1 | 5/2017 | Kowalyshyn |
| 9,660,879 | B1 | 5/2017 | Rothstein et al. |
| 9,692,658 | B2 | 6/2017 | Guo et al. |
| 9,715,820 | B1 | 7/2017 | Boss et al. |
| 9,729,416 | B1 | 8/2017 | Khanal et al. |
| 9,876,810 | B2 | 1/2018 | McDougal et al. |
| 9,888,021 | B2 | 2/2018 | Horesh et al. |
| 9,893,897 | B2 | 2/2018 | Li et al. |
| 9,967,292 | B1 | 5/2018 | Higgins |
| 10,009,364 | B2 | 6/2018 | Dasgupta et al. |
| 10,009,793 | B2 | 6/2018 | Wetterwald et al. |

(56) References Cited

U.S. PATENT DOCUMENTS

| | | |
|---|---|---|
| 10,027,689 B1 | 7/2018 | Rathor et al. |
| 10,028,167 B2 | 7/2018 | Calin et al. |
| 10,033,766 B2 | 7/2018 | Gupta et al. |
| 10,038,611 B1 | 7/2018 | Wu et al. |
| 10,063,434 B1 | 8/2018 | Khanal et al. |
| 10,176,323 B2 | 1/2019 | Zhang et al. |
| 10,198,667 B2 | 2/2019 | Ryan, Jr. et al. |
| 10,204,211 B2 | 2/2019 | Hammerle et al. |
| 10,237,294 B1 | 3/2019 | Zadeh et al. |
| 10,263,883 B2 | 4/2019 | Kamble |
| 10,264,003 B1 | 4/2019 | Wu et al. |
| 10,277,618 B1 | 4/2019 | Wu et al. |
| 10,320,749 B2 | 6/2019 | Sengupta et al. |
| 10,321,344 B2 | 6/2019 | Barton et al. |
| 10,326,676 B1 | 6/2019 | Driggs et al. |
| 10,332,005 B1 | 6/2019 | Liao et al. |
| 10,348,767 B1 | 7/2019 | Lee et al. |
| 10,375,155 B1 | 8/2019 | Cai et al. |
| 10,389,574 B1 | 8/2019 | Wu et al. |
| 10,411,978 B1 | 9/2019 | Ball et al. |
| 10,412,080 B1* | 9/2019 | Edwards .............. H04W 12/06 |
| 10,419,454 B2 | 9/2019 | El-Moussa et al. |
| 10,536,268 B2 | 1/2020 | Anderson et al. |
| 10,536,475 B1 | 1/2020 | McCorkle, Jr. et al. |
| 10,554,665 B1 | 2/2020 | Badawy et al. |
| 10,581,915 B2 | 3/2020 | Scherman et al. |
| 10,594,664 B2 | 3/2020 | Zaifman et al. |
| 10,594,718 B1 | 3/2020 | Deaguero et al. |
| 10,742,677 B1 | 8/2020 | Wu |
| 10,805,338 B2 | 10/2020 | Kohout et al. |
| 10,841,194 B2 | 11/2020 | Kim et al. |
| 10,992,693 B2 | 4/2021 | Luo et al. |
| 2002/0023080 A1 | 2/2002 | Uga et al. |
| 2002/0024964 A1 | 2/2002 | Baum et al. |
| 2002/0035604 A1 | 3/2002 | Cohen et al. |
| 2002/0055998 A1 | 5/2002 | Riddle et al. |
| 2002/0065912 A1 | 5/2002 | Catchpole et al. |
| 2002/0078382 A1 | 6/2002 | Sheikh et al. |
| 2002/0080720 A1 | 6/2002 | Pegrum et al. |
| 2002/0091844 A1 | 7/2002 | Craft et al. |
| 2002/0097724 A1 | 7/2002 | Halme et al. |
| 2002/0107953 A1 | 8/2002 | Ontiveros et al. |
| 2002/0133586 A1 | 9/2002 | Shanklin et al. |
| 2002/0133622 A1 | 9/2002 | Pinto |
| 2002/0152209 A1 | 10/2002 | Merugu et al. |
| 2002/0156880 A1 | 10/2002 | Mokuya |
| 2002/0175934 A1 | 11/2002 | Hand et al. |
| 2002/0199098 A1 | 12/2002 | Davis |
| 2003/0014628 A1 | 1/2003 | Freed et al. |
| 2003/0018891 A1 | 1/2003 | Hall et al. |
| 2003/0023733 A1 | 1/2003 | Lingafeit et al. |
| 2003/0084279 A1 | 5/2003 | Campagna |
| 2003/0093514 A1 | 5/2003 | Valdes et al. |
| 2003/0131116 A1 | 7/2003 | Jain et al. |
| 2003/0135667 A1 | 7/2003 | Mann et al. |
| 2003/0149887 A1 | 8/2003 | Yadav |
| 2003/0152094 A1 | 8/2003 | Colavito et al. |
| 2003/0156715 A1 | 8/2003 | Reeds, III et al. |
| 2003/0204621 A1 | 10/2003 | Poletto et al. |
| 2003/0212900 A1 | 11/2003 | Liu et al. |
| 2003/0214913 A1 | 11/2003 | Kan et al. |
| 2003/0217144 A1 | 11/2003 | Fu et al. |
| 2003/0233361 A1 | 12/2003 | Cady |
| 2004/0003094 A1 | 1/2004 | See |
| 2004/0047325 A1 | 3/2004 | Hameleers et al. |
| 2004/0049699 A1 | 3/2004 | Griffith et al. |
| 2004/0073512 A1 | 4/2004 | Maung |
| 2004/0088544 A1 | 5/2004 | Tariq et al. |
| 2004/0088557 A1 | 5/2004 | Malcolm et al. |
| 2004/0093414 A1 | 5/2004 | Orton |
| 2004/0093513 A1 | 5/2004 | Cantrell et al. |
| 2004/0146006 A1 | 7/2004 | Jackson |
| 2004/0162070 A1 | 8/2004 | Baral et al. |
| 2004/0199630 A1 | 10/2004 | Sarkissian et al. |
| 2004/0250059 A1 | 12/2004 | Ramelson et al. |
| 2005/0015455 A1 | 1/2005 | Liu |
| 2005/0015622 A1 | 1/2005 | Williams et al. |
| 2005/0050316 A1 | 3/2005 | Peles |
| 2005/0060427 A1 | 3/2005 | Phillips et al. |
| 2005/0066196 A1 | 3/2005 | Yagi |
| 2005/0086255 A1 | 4/2005 | Schran et al. |
| 2005/0091341 A1 | 4/2005 | Knight et al. |
| 2005/0091357 A1 | 4/2005 | Krantz et al. |
| 2005/0100000 A1 | 5/2005 | Faulkner et al. |
| 2005/0125553 A1 | 6/2005 | Wu et al. |
| 2005/0125684 A1 | 6/2005 | Schmidt |
| 2005/0182833 A1 | 8/2005 | Duffie, III et al. |
| 2005/0193245 A1 | 9/2005 | Hayden et al. |
| 2005/0201363 A1 | 9/2005 | Gilchrist et al. |
| 2005/0210242 A1 | 9/2005 | Troxel et al. |
| 2005/0234920 A1 | 10/2005 | Rhodes |
| 2005/0251009 A1 | 11/2005 | Morita et al. |
| 2005/0262237 A1 | 11/2005 | Fulton et al. |
| 2006/0029096 A1 | 2/2006 | Babbar et al. |
| 2006/0045016 A1 | 3/2006 | Dawdy et al. |
| 2006/0045017 A1 | 3/2006 | Yamasaki |
| 2006/0075358 A1 | 4/2006 | Ahokas |
| 2006/0085526 A1 | 4/2006 | Gulland |
| 2006/0101068 A1 | 5/2006 | Stuhec et al. |
| 2006/0106743 A1 | 5/2006 | Horvitz |
| 2006/0123477 A1 | 6/2006 | Raghavan et al. |
| 2006/0171333 A1 | 8/2006 | Shimada et al. |
| 2006/0174343 A1 | 8/2006 | Duthie et al. |
| 2006/0184535 A1 | 8/2006 | Kaluskar et al. |
| 2006/0188494 A1 | 8/2006 | Bach et al. |
| 2006/0191008 A1 | 8/2006 | Fernando et al. |
| 2006/0191009 A1 | 8/2006 | Ito et al. |
| 2006/0200572 A1 | 9/2006 | Schcolnik |
| 2006/0230452 A1 | 10/2006 | Field |
| 2006/0230456 A1 | 10/2006 | Nagabhushan et al. |
| 2006/0233349 A1 | 10/2006 | Cooper |
| 2007/0039051 A1 | 2/2007 | Duthie et al. |
| 2007/0043861 A1 | 2/2007 | Baron et al. |
| 2007/0067841 A1 | 3/2007 | Yegneswaran et al. |
| 2007/0077931 A1 | 4/2007 | Glinka |
| 2007/0088845 A1 | 4/2007 | Memon et al. |
| 2007/0110053 A1 | 5/2007 | Soni et al. |
| 2007/0143852 A1 | 6/2007 | Keanini et al. |
| 2007/0153689 A1 | 7/2007 | Strub et al. |
| 2007/0156886 A1 | 7/2007 | Srivastava |
| 2007/0156919 A1 | 7/2007 | Petti et al. |
| 2007/0157306 A1 | 7/2007 | Elrod et al. |
| 2007/0169190 A1 | 7/2007 | Kolton et al. |
| 2007/0188494 A1 | 8/2007 | Agutter et al. |
| 2007/0192863 A1 | 8/2007 | Kapoor et al. |
| 2007/0239639 A1 | 10/2007 | Loughmiller et al. |
| 2007/0245420 A1 | 10/2007 | Yong et al. |
| 2007/0256122 A1 | 11/2007 | Foo et al. |
| 2008/0022401 A1 | 1/2008 | Cameron et al. |
| 2008/0031141 A1 | 2/2008 | Lean et al. |
| 2008/0034424 A1 | 2/2008 | Overcash et al. |
| 2008/0034425 A1 | 2/2008 | Overcash et al. |
| 2008/0059582 A1 | 3/2008 | Hartikainen et al. |
| 2008/0062995 A1 | 3/2008 | Kaas et al. |
| 2008/0069002 A1 | 3/2008 | Savoor et al. |
| 2008/0103610 A1 | 5/2008 | Ebrom et al. |
| 2008/0130659 A1 | 6/2008 | Polland |
| 2008/0141275 A1 | 6/2008 | Borgendale et al. |
| 2008/0141374 A1 | 6/2008 | Sidiroglou et al. |
| 2008/0147818 A1 | 6/2008 | Sabo |
| 2008/0172416 A1 | 7/2008 | Ito |
| 2008/0212586 A1 | 9/2008 | Wang et al. |
| 2008/0219261 A1 | 9/2008 | Lin et al. |
| 2008/0222717 A1 | 9/2008 | Rothstein et al. |
| 2008/0232359 A1 | 9/2008 | Kim et al. |
| 2008/0279111 A1 | 11/2008 | Atkins et al. |
| 2008/0282080 A1 | 11/2008 | Hyndman et al. |
| 2008/0294384 A1 | 11/2008 | Fok et al. |
| 2008/0307219 A1 | 12/2008 | Karandikar |
| 2008/0320297 A1 | 12/2008 | Sabo et al. |
| 2009/0010259 A1 | 1/2009 | Sirotkin |
| 2009/0034426 A1 | 2/2009 | Luft et al. |
| 2009/0063665 A1 | 3/2009 | Bagepalli et al. |
| 2009/0089326 A1 | 4/2009 | Balasubramanian |

(56) References Cited

U.S. PATENT DOCUMENTS

| | | |
|---|---|---|
| 2009/0109973 A1 | 4/2009 | Ilnicki |
| 2009/0168657 A1 | 7/2009 | Puri et al. |
| 2009/0187653 A1 | 7/2009 | Fu et al. |
| 2009/0220080 A1 | 9/2009 | Herne et al. |
| 2009/0225675 A1 | 9/2009 | Baum et al. |
| 2009/0228330 A1 | 9/2009 | Karras et al. |
| 2009/0245083 A1 | 10/2009 | Hamzeh |
| 2009/0268605 A1 | 10/2009 | Campbell et al. |
| 2009/0271469 A1 | 10/2009 | Benco et al. |
| 2009/0292954 A1 | 11/2009 | Jiang et al. |
| 2009/0296593 A1 | 12/2009 | Prescott |
| 2009/0316602 A1 | 12/2009 | Nandy et al. |
| 2009/0319773 A1 | 12/2009 | Frenkel et al. |
| 2009/0327695 A1 | 12/2009 | Molsberry et al. |
| 2009/0328219 A1 | 12/2009 | Narayanaswamy |
| 2010/0027432 A1 | 2/2010 | Gopalan et al. |
| 2010/0091770 A1 | 4/2010 | Ishikawa |
| 2010/0095367 A1 | 4/2010 | Narayanaswamy |
| 2010/0131755 A1 | 5/2010 | Zhu et al. |
| 2010/0135498 A1 | 6/2010 | Long et al. |
| 2010/0167713 A1 | 7/2010 | Hoffman |
| 2010/0191856 A1 | 7/2010 | Gupta et al. |
| 2010/0192225 A1 | 7/2010 | Ma et al. |
| 2010/0201573 A1 | 8/2010 | Lamming |
| 2010/0226301 A1 | 9/2010 | Lohmar et al. |
| 2010/0250918 A1 | 9/2010 | Tremblay et al. |
| 2010/0250928 A1 | 9/2010 | Goto |
| 2010/0268937 A1 | 10/2010 | Blom et al. |
| 2010/0278056 A1 | 11/2010 | Meloche et al. |
| 2010/0281539 A1 | 11/2010 | Burns et al. |
| 2010/0299158 A1 | 11/2010 | Siegel |
| 2010/0316216 A1 | 12/2010 | Fukushima et al. |
| 2010/0322248 A1 | 12/2010 | Ivanov |
| 2010/0332618 A1 | 12/2010 | Norton et al. |
| 2011/0019574 A1 | 1/2011 | Malomsoky et al. |
| 2011/0055138 A1 | 3/2011 | Khanduja et al. |
| 2011/0126259 A1 | 5/2011 | Krishnamurthi et al. |
| 2011/0126275 A1* | 5/2011 | Anderson ............... H04L 63/08 726/8 |
| 2011/0173441 A1 | 7/2011 | Bagepalli et al. |
| 2011/0173490 A1 | 7/2011 | Narayanaswamy et al. |
| 2011/0197276 A1 | 8/2011 | Dorrendorf et al. |
| 2011/0231652 A1* | 9/2011 | Bollay ................. H04L 63/306 713/153 |
| 2011/0280149 A1 | 11/2011 | Okada et al. |
| 2011/0296002 A1 | 12/2011 | Caram |
| 2011/0320394 A1 | 12/2011 | McKeown et al. |
| 2011/0321160 A1 | 12/2011 | Mohandas et al. |
| 2012/0016977 A1 | 1/2012 | Robertson et al. |
| 2012/0030731 A1 | 2/2012 | Bhargava et al. |
| 2012/0084838 A1* | 4/2012 | Inforzato ............... G06F 21/575 726/4 |
| 2012/0130745 A1 | 5/2012 | Jones |
| 2012/0131330 A1 | 5/2012 | Tönsing et al. |
| 2012/0166962 A1 | 6/2012 | Lunsford |
| 2012/0176917 A1 | 7/2012 | Matityahu et al. |
| 2012/0210385 A1 | 8/2012 | Cirstea et al. |
| 2012/0215328 A1 | 8/2012 | Schmelzer |
| 2012/0216282 A1 | 8/2012 | Pappu et al. |
| 2012/0233694 A1 | 9/2012 | Baliga et al. |
| 2012/0243533 A1 | 9/2012 | Leong |
| 2012/0278477 A1 | 11/2012 | Terrell et al. |
| 2012/0278890 A1 | 11/2012 | Määttä et al. |
| 2012/0284791 A1 | 11/2012 | Miller et al. |
| 2012/0290711 A1 | 11/2012 | Upham et al. |
| 2012/0294305 A1 | 11/2012 | Rose et al. |
| 2012/0324585 A1 | 12/2012 | Beckett, III et al. |
| 2013/0007296 A1 | 1/2013 | Mukherjee et al. |
| 2013/0010608 A1 | 1/2013 | Ramachandran et al. |
| 2013/0042323 A1 | 2/2013 | Narayanaswamy et al. |
| 2013/0061036 A1 | 3/2013 | Oliver |
| 2013/0064084 A1 | 3/2013 | Babbar et al. |
| 2013/0067034 A1 | 3/2013 | Degioanni et al. |
| 2013/0097203 A1 | 4/2013 | Bhattacharjee et al. |
| 2013/0103734 A1 | 4/2013 | Boldyrev et al. |
| 2013/0133032 A1 | 5/2013 | Li et al. |
| 2013/0166730 A1 | 6/2013 | Wilkinson |
| 2013/0176842 A1 | 7/2013 | Bauchot et al. |
| 2013/0188645 A1 | 7/2013 | Mack-Crane |
| 2013/0198512 A1 | 8/2013 | Rubin et al. |
| 2013/0198827 A1* | 8/2013 | Bhaskaran ............ H04L 63/10 726/7 |
| 2013/0212297 A1 | 8/2013 | Varga |
| 2013/0227259 A1 | 8/2013 | Kim |
| 2013/0232104 A1 | 9/2013 | Goyal et al. |
| 2013/0262655 A1 | 10/2013 | Deschênes et al. |
| 2013/0305357 A1 | 11/2013 | Ayyagari et al. |
| 2013/0339514 A1 | 12/2013 | Crank et al. |
| 2013/0347018 A1 | 12/2013 | Limp et al. |
| 2014/0020067 A1 | 1/2014 | Kim et al. |
| 2014/0040451 A1 | 2/2014 | Agrawal et al. |
| 2014/0068035 A1 | 3/2014 | Croy et al. |
| 2014/0075536 A1 | 3/2014 | Davis et al. |
| 2014/0077956 A1 | 3/2014 | Sampath et al. |
| 2014/0109168 A1 | 4/2014 | Ashley et al. |
| 2014/0149456 A1 | 5/2014 | Carr et al. |
| 2014/0164584 A1 | 6/2014 | Joe et al. |
| 2014/0165207 A1 | 6/2014 | Engel et al. |
| 2014/0189093 A1 | 7/2014 | du Toit et al. |
| 2014/0195797 A1 | 7/2014 | du Toit |
| 2014/0222998 A1 | 8/2014 | Vasseur et al. |
| 2014/0223325 A1 | 8/2014 | Melendez et al. |
| 2014/0242972 A1 | 8/2014 | Siotznick |
| 2014/0258511 A1 | 9/2014 | Sima et al. |
| 2014/0269777 A1 | 9/2014 | Rothstein et al. |
| 2014/0304211 A1 | 10/2014 | Horvitz |
| 2014/0310392 A1 | 10/2014 | Ho |
| 2014/0317288 A1 | 10/2014 | Krueger et al. |
| 2014/0344633 A1 | 11/2014 | Li et al. |
| 2014/0351415 A1 | 11/2014 | Harrigan et al. |
| 2015/0006896 A1 | 1/2015 | Franck |
| 2015/0007314 A1 | 1/2015 | Vaughan |
| 2015/0023168 A1 | 1/2015 | Kotecha et al. |
| 2015/0026027 A1 | 1/2015 | Priess et al. |
| 2015/0058987 A1 | 2/2015 | Thure et al. |
| 2015/0063158 A1 | 3/2015 | Nedeltchev et al. |
| 2015/0074258 A1 | 3/2015 | Ferreira et al. |
| 2015/0074462 A1 | 3/2015 | Jacoby |
| 2015/0089034 A1 | 3/2015 | Stickle et al. |
| 2015/0096022 A1 | 4/2015 | Vincent et al. |
| 2015/0100780 A1 | 4/2015 | Rubin et al. |
| 2015/0106616 A1* | 4/2015 | Nix ...................... H04W 40/005 713/156 |
| 2015/0106930 A1 | 4/2015 | Honda et al. |
| 2015/0113588 A1* | 4/2015 | Wing ................... H04L 63/0227 726/1 |
| 2015/0121461 A1 | 4/2015 | Dulkin et al. |
| 2015/0134554 A1 | 5/2015 | Clais et al. |
| 2015/0134776 A1 | 5/2015 | Kruglick |
| 2015/0149828 A1 | 5/2015 | Mukerji et al. |
| 2015/0180759 A1 | 6/2015 | Fallon |
| 2015/0180890 A1 | 6/2015 | Ronen et al. |
| 2015/0188702 A1 | 7/2015 | Men et al. |
| 2015/0199613 A1 | 7/2015 | Ruiz et al. |
| 2015/0227859 A1 | 8/2015 | Ames, II |
| 2015/0229661 A1 | 8/2015 | Balabine et al. |
| 2015/0242627 A1 | 8/2015 | Lee et al. |
| 2015/0249512 A1 | 9/2015 | Adimatyam et al. |
| 2015/0269358 A1 | 9/2015 | Hesketh et al. |
| 2015/0277802 A1 | 10/2015 | Oikarinen et al. |
| 2015/0331771 A1 | 11/2015 | Conway |
| 2015/0341379 A1 | 11/2015 | Lefebvre et al. |
| 2015/0350167 A1 | 12/2015 | Djakovic |
| 2015/0365438 A1 | 12/2015 | Carver et al. |
| 2016/0006766 A1 | 1/2016 | Joo |
| 2016/0026922 A1 | 1/2016 | Vasseur et al. |
| 2016/0028755 A1 | 1/2016 | Vasseur et al. |
| 2016/0036647 A1 | 2/2016 | Gonzalez et al. |
| 2016/0043919 A1 | 2/2016 | Connelly et al. |
| 2016/0055335 A1 | 2/2016 | Herwono et al. |
| 2016/0056959 A1 | 2/2016 | Blom et al. |
| 2016/0080236 A1 | 3/2016 | Nikolaev et al. |
| 2016/0093205 A1 | 3/2016 | Boyer |
| 2016/0119215 A1 | 4/2016 | Deschênes et al. |

(56) References Cited

U.S. PATENT DOCUMENTS

| | | | |
|---|---|---|---|
| 2016/0127401 A1 | 5/2016 | Chauhan et al. |
| 2016/0134659 A1 | 5/2016 | Reddy et al. |
| 2016/0142435 A1 | 5/2016 | Bernstein et al. |
| 2016/0173288 A1 | 6/2016 | Li et al. |
| 2016/0173556 A1 | 6/2016 | Park et al. |
| 2016/0182274 A1 | 6/2016 | Kiesekamp et al. |
| 2016/0197949 A1 | 7/2016 | Nyhuis et al. |
| 2016/0219066 A1 | 7/2016 | Vasseur et al. |
| 2016/0226913 A1* | 8/2016 | Sood .................. G06F 21/577 |
| 2016/0241574 A1 | 8/2016 | Kumar et al. |
| 2016/0262044 A1 | 9/2016 | Calin et al. |
| 2016/0285752 A1 | 9/2016 | Joshi |
| 2016/0294870 A1 | 10/2016 | Banerjee et al. |
| 2016/0301624 A1 | 10/2016 | Gonzalez et al. |
| 2016/0301709 A1 | 10/2016 | Hassanzadeh et al. |
| 2016/0308725 A1 | 10/2016 | Tang et al. |
| 2016/0357964 A1 | 12/2016 | Mulchandani |
| 2016/0357967 A1 | 12/2016 | Mulchandani |
| 2016/0359872 A1 | 12/2016 | Yadav et al. |
| 2016/0359915 A1 | 12/2016 | Gupta et al. |
| 2016/0373414 A1 | 12/2016 | MacCarthaigh |
| 2016/0380885 A1 | 12/2016 | Jani et al. |
| 2017/0048109 A1 | 2/2017 | Kant et al. |
| 2017/0070416 A1 | 3/2017 | Narayanan et al. |
| 2017/0076206 A1 | 3/2017 | Lastras-Montano et al. |
| 2017/0085590 A1 | 3/2017 | Hsu et al. |
| 2017/0090906 A1 | 3/2017 | Reynolds |
| 2017/0093796 A1 | 3/2017 | Wang et al. |
| 2017/0093891 A1 | 3/2017 | Mitchell |
| 2017/0093897 A1 | 3/2017 | Cochin et al. |
| 2017/0097982 A1 | 4/2017 | Zhang et al. |
| 2017/0099196 A1 | 4/2017 | Barsheshet et al. |
| 2017/0111272 A1 | 4/2017 | Liu et al. |
| 2017/0118092 A1 | 4/2017 | Dixon et al. |
| 2017/0123886 A1 | 5/2017 | Vaideeswaran |
| 2017/0126472 A1 | 5/2017 | Margalit et al. |
| 2017/0126709 A1 | 5/2017 | Baradaran et al. |
| 2017/0134937 A1 | 5/2017 | Miller et al. |
| 2017/0195353 A1 | 7/2017 | Taylor et al. |
| 2017/0230270 A1 | 8/2017 | Padinhakara et al. |
| 2017/0230417 A1 | 8/2017 | Amar et al. |
| 2017/0270105 A1 | 9/2017 | Ninan et al. |
| 2017/0279837 A1 | 9/2017 | Dasgupta et al. |
| 2017/0279838 A1 | 9/2017 | Dasgupta et al. |
| 2017/0279839 A1 | 9/2017 | Vasseur et al. |
| 2017/0288974 A1 | 10/2017 | Yoshihira et al. |
| 2017/0288987 A1 | 10/2017 | Pasupathy et al. |
| 2017/0289104 A1 | 10/2017 | Shankar et al. |
| 2017/0289168 A1 | 10/2017 | Bar et al. |
| 2017/0289185 A1* | 10/2017 | Mandyam ........... H04L 63/0245 |
| 2017/0289847 A1 | 10/2017 | Wetterwald et al. |
| 2017/0310703 A1 | 10/2017 | Ackerman et al. |
| 2017/0324758 A1 | 11/2017 | Hart et al. |
| 2017/0353437 A1 | 12/2017 | Ayyadevara et al. |
| 2017/0353477 A1 | 12/2017 | Faigon et al. |
| 2017/0364794 A1 | 12/2017 | Mahkonen et al. |
| 2017/0366526 A1 | 12/2017 | Wood et al. |
| 2018/0007087 A1* | 1/2018 | Grady .................. G06F 21/31 |
| 2018/0013650 A1 | 1/2018 | Khanal et al. |
| 2018/0084011 A1 | 3/2018 | Joseph et al. |
| 2018/0091413 A1 | 3/2018 | Richards et al. |
| 2018/0103056 A1 | 4/2018 | Kohout et al. |
| 2018/0109507 A1 | 4/2018 | Caldera et al. |
| 2018/0109557 A1 | 4/2018 | Yoo et al. |
| 2018/0131675 A1 | 5/2018 | Sengupta et al. |
| 2018/0131711 A1 | 5/2018 | Chen et al. |
| 2018/0137001 A1 | 5/2018 | Zong et al. |
| 2018/0139227 A1 | 5/2018 | Martin et al. |
| 2018/0167310 A1 | 6/2018 | Kamble |
| 2018/0191755 A1 | 7/2018 | Monaco et al. |
| 2018/0198812 A1 | 7/2018 | Christodorescu et al. |
| 2018/0219879 A1 | 8/2018 | Pierce |
| 2018/0260715 A1 | 9/2018 | Yan et al. |
| 2018/0262487 A1 | 9/2018 | Zaifman et al. |
| 2018/0276561 A1 | 9/2018 | Pasternack et al. |
| 2018/0351781 A1 | 12/2018 | Movsisyan et al. |
| 2018/0351970 A1 | 12/2018 | Majumder et al. |
| 2018/0375893 A1 | 12/2018 | Jordan et al. |
| 2019/0005205 A1 | 1/2019 | Dargar et al. |
| 2019/0007283 A1 | 1/2019 | Kieviet et al. |
| 2019/0012441 A1 | 1/2019 | Tuli et al. |
| 2019/0028357 A1 | 1/2019 | Kokkula et al. |
| 2019/0052554 A1 | 2/2019 | Mukerji et al. |
| 2019/0052675 A1 | 2/2019 | Krebs |
| 2019/0068465 A1 | 2/2019 | Khanal et al. |
| 2019/0095478 A1 | 3/2019 | Tankersley et al. |
| 2019/0102469 A1 | 4/2019 | Makovsky et al. |
| 2019/0121979 A1 | 4/2019 | Chari et al. |
| 2019/0132359 A1 | 5/2019 | Kraenzel et al. |
| 2019/0163678 A1 | 5/2019 | Bath et al. |
| 2019/0171725 A1 | 6/2019 | Shen et al. |
| 2019/0196912 A1 | 6/2019 | Didehban et al. |
| 2019/0236149 A1 | 8/2019 | Kuruvada et al. |
| 2019/0245734 A1 | 8/2019 | Wu et al. |
| 2019/0245763 A1 | 8/2019 | Wu et al. |
| 2019/0266999 A1 | 8/2019 | Chandrasekaran et al. |
| 2019/0303198 A1 | 10/2019 | Kim et al. |
| 2019/0372828 A1 | 12/2019 | Wu et al. |
| 2020/0034528 A1* | 1/2020 | Yang .................. G06F 21/53 |
| 2020/0067952 A1 | 2/2020 | Deaguero et al. |
| 2020/0220849 A1 | 7/2020 | Zaifman et al. |
| 2020/0236131 A1 | 7/2020 | Vejman et al. |
| 2020/0287885 A1* | 9/2020 | Rodniansky ...... H04L 29/06639 |
| 2020/0389469 A1 | 12/2020 | Litichever et al. |
| 2021/0006589 A1 | 1/2021 | Kohout et al. |
| 2021/0185087 A1 | 6/2021 | Wu et al. |
| 2021/0250368 A1 | 8/2021 | Hearty et al. |
| 2021/0288993 A1 | 9/2021 | Kraning et al. |

FOREIGN PATENT DOCUMENTS

| | | |
|---|---|---|
| CN | 109104441 A | 12/2018 |
| CN | 109542772 | 3/2019 |
| CN | 110113349 A | 8/2019 |
| CN | 112085039 A | 12/2020 |
| CN | 112398876 A | 2/2021 |
| DE | 69553953 T2 | 4/2006 |
| EP | 0702477 A2 | 3/1996 |
| EP | 0702477 A3 | 7/1999 |
| EP | 1026867 A2 | 8/2000 |
| EP | 0702477 B1 | 1/2005 |
| EP | 2057576 A2 | 5/2009 |
| EP | 2057576 A4 | 4/2012 |
| EP | 3089424 A1 | 11/2016 |
| EP | 3113443 A1 | 1/2017 |
| EP | 3306890 A1 | 4/2018 |
| KR | 960012819 A | 4/1996 |
| KR | 100388606 B1 | 11/2003 |
| KR | 20140039060 A | 7/2014 |
| KR | 101662614 B1 | 10/2016 |
| WO | 2008026212 A2 | 3/2008 |
| WO | 2008026212 A3 | 3/2008 |
| WO | 2009015461 A1 | 2/2009 |
| WO | 2016118131 A1 | 7/2016 |
| WO | 2016144932 A1 | 9/2016 |

OTHER PUBLICATIONS

Office Communication for U.S. Appl. No. 13/831,673 dated Mar. 6, 2014, pp. 1-12.

Office Communication for U.S. Appl. No. 13/831,673 dated May 22, 2014, pp. 1-5.

Office Communication for U.S. Appl. No. 13/831,626 dated Sep. 3, 2013, pp. 1-17.

Office Communication for U.S. Appl. No. 13/831,959 dated Aug. 22, 2013, pp. 1-9.

Handel, Theodore G. et al., "Hiding data in the OSI network model." In: Anderson R. (eds) Information Hiding. IH 1996. Lecture Notes in Computer Science, vol. 1174. Springer, Berlin, Heidelberg. pp. 23-38.

Office Communication for U.S. Appl. No. 14/500,893 dated Nov. 20, 2014, pp. 1-15.

(56) References Cited

OTHER PUBLICATIONS

Office Communication for U.S. Appl. No. 14/107,580 dated Mar. 6, 2014, pp. 1-13.
Office Communication for U.S. Appl. No. 14/107,580 dated Sep. 15, 2014, pp. 1-15.
Office Communication for U.S. Appl. No. 13/831,908 dated Aug. 9, 2013, pp. 1-29.
Office Communication for U.S. Appl. No. 13/831,908 dated Jan. 13, 2014, pp. 1-31.
Office Communication for U.S. Appl. No. 13/831,908 dated Apr. 9, 2014, pp. 1-3.
Office Communication for U.S. Appl. No. 13/831,908 dated Jun. 25, 2014, pp. 1-15.
Office Communication for U.S. Appl. No. 14/518,996 dated Nov. 20, 2014, pp. 1-41.
Office Communication for U.S. Appl. No. 14/107,631 dated Feb. 20, 2014, pp. 1-16.
Office Communication for U.S. Appl. No. 14/107,631 dated Sep. 26, 2014, pp. 1-14.
Office Communication for U.S. Appl. No. 14/107,631 dated Dec. 30, 2014, pp. 1-12.
Handley, Mark et al., "Network Intrusion Detection: Evasion, Traffic Normalization, and End-to-End Protocol Semantics," 2011, International Computer Science Institute, pp. 1-17.
Information Sciences Institute, "Internet Protocol Darpa Internet Program Protocol Specification," Sep. 1981, pp. 1-36.
Fuertes, Juan Antonio Cordero, "Evaluation of OSPF Extensions in MANET Routing," Paris, 2007, pp. 1-192.
Parsons, Christopher, "Moving Across the Internet: Code-Bodies, Code-Corpses, and Network Architecture," May 9, 2010, pp. 1-20.
Zander, Sebastian et al., "Covert Channels and Countermeasures in Computer Network Protocols," Dec. 2007, pp. 1-7.
Office Communication for U.S. Appl. No. 14/107,580 dated Mar. 17, 2015, pp. 1-5.
Lin, Mark, "An Overview of Session Hijacking at the Network and Application Levels," Jan. 18, 2005, pp. 1-16.
U.S. Appl. No. 11/683,643, filed Mar. 8, 2007, pp. 1-48.
U.S. Appl. No. 11/679,356, filed Feb. 27, 2007, pp. 1-45.
Office Communication for U.S. Appl. No. 12/326,672 dated Jun. 9, 2010, pp. 1-9.
Office Communication for U.S. Appl. No. 12/326,672 dated Dec. 23, 2010, pp. 1-15.
Office Communication for U.S. Appl. No. 12/326,672 dated Jun. 22, 2011, pp. 1-16.
Office Communication for U.S. Appl. No. 12/326,672 dated Oct. 24, 2011, pp. 1-9.
Office Communication for U.S. Appl. No. 11/683,643 dated Apr. 28, 2010, pp. 1-35.
Office Communication for U.S. Appl. No. 11/683,643 dated Oct. 14, 2010, pp. 1-43.
Office Communication for U.S. Appl. No. 11/683,643 dated Aug. 25, 2011, pp. 1-43.
Office Communication for U.S. Appl. No. 11/683,643 dated Jan. 23, 2012, pp. 1-22.
Office Communication for U.S. Appl. No. 15/014,932 dated Jun. 10, 2016, pp. 1-20.
Office Communication for U.S. Appl. No. 15/207,213 dated Oct. 25, 2016, pp. 1-18.
Office Communication for U.S. Appl. No. 15/014,932 dated Dec. 14, 2016, pp. 1-26.
Digital Imaging and Communications in Medicine (DICOM), Part 6: Data Dictionary, PS Jun. 3, 2011, 2011, http://dicom.nema.org/Dicom/2011 /11_06pu.pdf, pp. 1-216.
Health Level Seven, Version 2,6, Appendix A. Nov. 2007, https://www.hl7.org/special/committees/vocab/V26_Appendix_A.pdf, pp. 1-255.
Office Communication for U.S. Appl. No. 15/207,213 dated Feb. 23, 2017, pp. 1-24.
Office Communication for U.S. Appl. No. 15/014,932 dated Mar. 3, 2017, pp. 1-6.
Office Communication for U.S. Appl. No. 15/207,213 dated May 8, 2017, pp. 1-6.
Office Communication for U.S. Appl. No. 15/207,213 dated Jun. 1, 2017, pp. 1-24.
Office Communication for U.S. Appl. No. 15/014,932 dated Aug. 1, 2017, pp. 1-27.
Office Communication for U.S. Appl. No. 15/690,135 dated Jan. 18, 2018, pp. 1-6.
Office Communication for U.S. Appl. No. 15/891,311 dated Apr. 23, 2018, pp. 1-18.
Office Communication for U.S. Appl. No. 15/892,327 dated Apr. 23, 2018, pp. 1-6.
Office Communication for U.S. Appl. No. 15/014,932 dated May 15, 2018, pp. 1-23.
Office Communication for U.S. Appl. No. 15/891,273 dated Jun. 19, 2018, pp. 1-20.
Office Communication for U.S. Appl. No. 15/014,932 dated Jul. 16, 2018, pp. 1-4.
Office Communication for U.S. Appl. No. 15/690,135 dated May 22, 2018, pp. 1-7.
Office Communication for U.S. Appl. No. 15/984,197 dated Aug. 31, 2018, pp. 1-25.
Office Communication for U.S. Appl. No. 15/891,311 dated Sep. 24, 2018, pp. 1-14.
Office Communication for U.S. Appl. No. 16/048,939 dated Sep. 19, 2018, pp. 1-9.
Office Communication for U.S. Appl. No. 16/113,442 dated Nov. 6, 2018, pp. 1-10.
Office Communication for U.S. Appl. No. 16/100,116 dated Nov. 15, 2018, pp. 1-7.
Office Communication for U.S. Appl. No. 15/014,932 dated Nov. 23, 2018, pp. 1-10.
Office Communication for U.S. Appl. No. 16/107,509 dated Oct. 26, 2018, pp. 1-26.
Office Communication for U.S. Appl. No. 15/891,273 dated Jan. 15, 2019, pp. 1-23.
Office Communication for U.S. Appl. No. 15/891,311 dated Jan. 29, 2019, pp. 1-8.
Office Communication for U.S. Appl. No. 16/174,051 dated Jan. 29, 2019, pp. 1-21.
Office Communication for U.S. Appl. No. 15/671,060 dated May 8, 2019, pp. 1-19.
Office Communication for U.S. Appl. No. 16/113,442 dated Jun. 5, 2019, pp. 1-8.
Office Communication for U.S. Appl. No. 15/891,273 dated May 28, 2019, pp. 1-14.
Office Communication for U.S. Appl. No. 16/107,509 dated Apr. 1, 2019, pp. 1-21.
Office Communication for U.S. Appl. No. 16/048,939 dated Jun. 20, 2019, pp. 1-8.
Office Communication for U.S. Appl. No. 16/100,116 dated May 30, 2019, pp. 1-5.
Office Communication for U.S. Appl. No. 16/384,574 dated May 31, 2019, pp. 1-12.
Office Communication for U.S. Appl. No. 16/107,509 dated Jun. 14, 2019, pp. 1-5.
Office Communication for U.S. Appl. No. 16/107,509 dated Aug. 21, 2019, pp. 1-25.
Office Communication for U.S. Appl. No. 16/384,574 dated Oct. 8, 2019, pp. 1-13.
Office Communication for U.S. Appl. No. 16/543,243 dated Sep. 27, 2019, pp. 1-24.
Office Communication for U.S. Appl. No. 16/048,939 dated Dec. 5, 2019, pp. 1-9.
Office Communication for U.S. Appl. No. 16/565,109 dated Nov. 27, 2019, pp. 1-18.
Office Communication for U.S. Appl. No. 16/525,290 dated Oct. 31, 2019, pp. 1-9.
Office Communication for U.S. Appl. No. 16/532,275 dated Oct. 24, 2019, pp. 1-29.
Office Communication for U.S. Appl. No. 16/560,886 dated Dec. 6, 2019, pp. 1-17.

(56) References Cited

OTHER PUBLICATIONS

Office Communication for U.S. Appl. No. 14/500,893 dated Feb. 18, 2015, pp. 1-11.
Office Communication for U.S. Appl. No. 14/518,996 dated Apr. 20, 2015, pp. 1-37.
Office Communication for U.S. Appl. No. 14/500,893 dted Jun. 15, 2015, pp. 1-12.
Office Communication for U.S. Appl. No. 14/518,996 dated Jul. 21, 2015, pp. 1-17.
Office Communication for U.S. Appl. No. 14/695,690 dated Sep. 9, 2015, pp. 1-41.
Office Communication for U.S. Appl. No. 14/695,690 dated Feb. 24, 2016, pp. 1-11.
Office Communication for U.S. Appl. No. 15/150,354 dated Jul. 5, 2016, pp. 1-18.
Mozilla Developer Network, "NSS Key Log Format," https://developer.mozilla.org/en-US/docs/Mozilla/Projects/NSS/Key_Log_Format, Jan. 8, 2010, p. 1.
Extended European Search Report for European Patent Application No. 16166907.2 dated Sep. 30, 2016, pp. 1-7.
Office Communication for U.S. Appl. No. 15/150,354 dated Feb. 8, 2017, pp. 1-8.
Office Communication for U.S. Appl. No. 15/466,248 dated Jun. 5, 2017, pp. 1-30.
Office Communication for U.S. Appl. No. 15/466,248 dated Oct. 3, 2017, pp. 1-34.
Office Communication for U.S. Appl. No. 15/457,886 dated Jan. 5, 2018, pp. 1-11.
Office Communication for U.S. Appl. No. 15/466,248 dated Jan. 11, 2018, pp. 1-2.
Examination Report for European Patent Application No. 16166907.2 dated Mar. 9, 2018, pp. 1-4.
Shaver, Jim, "Decrypting TLS Browser Traffic with Wireshark the easy way", https://jimshaver.net/2015/02/11/decrypting-tls-browser-traffic-with-wireshark-the-easy-way/, Feb. 11, 2015, pp. 1-30.
Office Communication for U.S. Appl. No. 15/466,248 dated Mar. 8, 2018, pp. 1-34.
Office Communication for U.S. Appl. No. 15/457,886 dated Jul. 18, 2018, pp. 1-11.
Office Communication for U.S. Appl. No. 15/466,248 dated Jul. 11, 2018, pp. 1-31.
International Search Report and Written Opinion for International Patent Application No. PCT/US2017/068585 dated Jul. 4, 2018, pp. 1-11.
Extended European Search Report for European Patent Application No. 17210995.1 dated Jul. 6, 2018, pp. 1-11.
Office Communication for U.S. Appl. No. 15/466,248 dated Oct. 18, 2018, pp. 1-31.
Office Communication for U.S. Appl. No. 15/457,886 dated Mar. 20, 2019, pp. 1-9.
Office Communication for U.S. Appl. No. 15/466,246 dated May 16, 2019, pp. 1-33.
Office Communication for U.S. Appl. No. 15/466,248 dated Sep. 10, 2019, pp. 1-27.
Office Communication for U.S. Appl. No. 15/971,843 dated Oct. 22, 2019, pp. 1-15.
Office Cammunicatian for U.S. Appl. No. 14/750,905 dated Sep. 22, 2015, pp. 1-12.
Office Cmnmunicaiicm for U.S. Appl. No. 14/750,905 dated Jan. 19, 2015, pp. 1-5.
Office Communication for U.S. Appl. No. 15/982,925 dated Sep. 13, 2016, pp. 1-7.
Office Communication for U.S. Appl. No. 15/289,760 dated Dec. 12, 2016, pp. 1-12.
Office Communicatien for U.S. Appl. No. 15/213,016 dated Nov. 22, 2016, pp. 1-12.
Office Communication for U.S. Appl. No, 15/356,381 dated Jan. 6, 2017, pp. 1-57.
Office Communication for U.S. Appl. No. 15/082,925 dated Feb. 1, 2017, pp. 1-6.
Office Communication for U.S. Appl. No. 15/219,016 dated Mar. 18, 2017, pp. 1-9.
Office Communication for U.S. Appl. No. 15/443,868 dated Apr. 27, 2317, pp. 1-7.
Office Communication for U.S. Appl. No. 15/585,887 dated June 27, 2017, pp. 1-24.
Office Communication for U.S. Appl. No. 15/356,381 dated Jul. 3, 2017, pp. 1-21.
Office Communication for U.S. Appl. No. 15/675,216 dated Jun. 7, 2018, pp. 1-4.
Office Communication for U.S. Appl. No. 15/443,868 dated Aug. 11, 2017, pp. 1-11
Office Communication for U.S. Appl. No. 15/575,216 dated Nov. 26, 2017, pp. 1-7.
Office Communication for U.S. Appl. No. 15/585,887 dated Nov. 28, 2017, pp. 1-23.
International Search Report and Written Opinion for International Patent Application No. PCT/US2018/030145 dated Aug. 10, 2018, pp. 1-12.
Svoboda, Jakub, "Network Traffic Analysis with Deep Packet Inspection Method," Masaryk University, Facuity of Informatics, Master's Thesis, 2014, pp. 1-14.
International Search Report and Written Opinion for International Patent Application No. PCT/US2017/068586 dated Aug. 9, 2018, pp. 1-14.
Extended European Search Report for European Patent Application No. 17210996.9 dated Jun. 13, 2018, pp. 1-7.
Office Communication for U.S. Appl. No. 15/855,769 dated Feb. 5, 2019, pp. 1-10.
Office Communication for U.S. Appl. No. 15/855,769 dated May 1, 2019, pp. 1-7.
Office Communication for U.S. Appl. No. 16/459,472 dated Aug. 14, 2019, pp. 1-15.
Office Communication for U.S. Appl. No. 15/585,837 dated Mar. 20, 2019, pp. 1-26.
Office Communication for U.S. Appl. No. 15/675,216 dated Aug. 28, 2018, pp. 1-14.
Office Communication for U.S. Appl. No. 15/575,216 dated Jan. 29, 2019, pp. 1-8.
Office Communication for U.S. Appl. No. 16/384,697 dated May 30, 2019, pp. 1-12.
Office Communicatien for U.S. Appl. No. 15/384,574 dated Jan. 13, 2020, pp. 1-9.
Office Communication for U.S. Appl. No. 16/107,509 dated Jan. 23, 2020, pp. 1-12.
Office Communication for U.S. Appl. No. 15/585,887 dated Jan. 22, 2020, pp. 1-28.
Office Communication for U.S. Appl. No. 16,384,697 dated Oct. 17, 2019, pp. 1-8.
Office Communication for U.S. Appl. No. 16/459,472 dated Feb. 3, 2020, pp. 1-7.
Office Communication for U.S. Appl. No. 16/679,055 dated Feb. 14, 2020, pp. 1-32.
Office Communication for U.S. Appl. No. 16/048,939 dated Feb. 18, 2020, pp. 1-15.
Office Communication for U.S. Appl. No. 16/424,387 dated Feb. 24, 2020, pp. 1-15.
Office Communication for U.S. Appl. No. 16/718,050 dated Feb. 27, 2020, pp. 1-21.
Wade, Susan Marie, ""SCADA Honeynets: The attractiveness of honeypots as critical infrastructure security tools for the detection and anaiysis of advanced threats"" (2011). Graduate Theses and Dissertations. 12138. https://lib.dr.lastate.edu/etd/12138, pp. 1-67.
Office Communication for U.S. Appl. No. 16/525,290 dated Mar. 12, 2020, pp. 1-10.
Office Communication for U.S. Appl. No. 15/971,843 dated Mar. 25, 2020, pp. 1-14.
Office Communication for U.S. Appl. No. 16/048,939 dated Mar. 26, 2020, pp. 1-6,
Office Communication for U.S. Appl. No. 16/543,243 dated Apr. 7, 2020, pp. 1-22.
Office Communication for U.S. Appl. No. 16/532,275 dated Apr. 20, 2020, pp. 1-8.

(56) References Cited

OTHER PUBLICATIONS

Office Communication for U.S. Appl. No. 16/560,886 dated Apr. 22, 2020, pp. 1-10.
Office Communication for U.S. Appl. No. 16/565,109 dated May 8, 2020, pp. 1-19.
Examination Report for European Patent Application No. 16166907.2 dated Dec. 19, 2019, pp. 1-6.
Examination Report for European Paient Application No. 17210996.9 dated May 27, 2020, pp. 1-3.
Office Communication for U.S. Appl. No. 15/585,887 dated Aug. 28, 2020, pp. 1-30.
Office Communication for U.S. Appl. No. 16/679,055 dated Sep. 4, 2020, pp. 1-5.
Office Communication for U.S. Appl. No. 16/718,050 dated Sep. 4, 2020, pp. 1-23.
Office Communication for U.S. Appl. No. 16/525,290 dated Sep. 23, 2020, pp. 1-10.
International Search Report and Written Opinion for International Patent Application No. PCT/US2019/030015 dated Aug. 7, 2019, pp. 1-6.
International Search Report and Written Opinion for International Patent Application No. PCT/US2019/018097 dated May 28, 2019, pp. 1-9.
Office Communication for U.S. Appl. No. 15/971,843 dated Oct. 27, 2020, pp. 1-11.
Office Communication for U.S. Appl. No. 16/424,387 dated Nov. 24, 2020, pp. 1-23.
Office Communication for U.S. Appl. No. 16/543,243 dated Dec. 16, 2020, pp. 1-13.
Office Communication for U.S. Appl. No. 16/565,109 dated Jan. 19, 2021, pp. 1-9.
Office Communication for U.S. Appl. No. 16/813,649 dated Feb. 24, 2021, pp. 1-7.
Office Communication for U.S. Appl. No. 16/679,055 dated Mar. 16, 2021, pp. 1-33.
Office Communication for U.S. Appl. No. 15/585,887 dated Mar. 23, 2021, pp. 1-31.
Office Communication for U.S. Appl. No. 16/525,290 dated Mar. 31, 2021, pp. 1-11.
Office Communication for U.S. Appl. No. 15/971,843 dated May 5, 2021, pp. 1-9.
Office Communication for U.S. Appl. No. 16/820,582 dated May 10, 2021, pp. 1-24.
Office Communication for U.S. Appl. No. 16/525,290 dated Jun. 15, 2021, pp. 1-4.
Examination Report for European Patent Application No. 17210996.9 dated May 21, 2021, pp. 1-6.
Office Communication for U.S. Appl. No. 16/525,290 dated Jul. 9, 2021, pp. 1-7.
Office Communication for U.S. Appl. No. 16/679,055 dated Jul. 26, 2021, pp. 1-34.
Office Communicatien for U.S. Appl. No. 16/718,050 dated Jul. 27, 2021, pp. 1-23.
Office Communication for U.S. Appl. No, 15/971,843 dated Jul. 28, 2021, pp. 1-9.
Office Communication for U.S. Appl. No. 15/585,887 dated Aug. 17, 2021, pp. 1-41.
Office Communication for U.S. Appl. No. 16/820,582 dated Sep. 27, 2021, pp. 1-25.
Office Communication for U.S. Appl. No. 16/679,055 dated Oct. 12, 2021, pp. 1-3.
Office Communication for U.S. Appl. No. 17/351,866 dated Oct. 18, 2021, pp. 1-12.
Office Communication for U.S. Appl. No. 17/337,299 dated Oct. 21, 2021, pp. 1-34.
Office Communication for U.S. Appl. No. 15/585,887 dated Nov. 2, 2021, pp. 1-4.
Office Communication for U.S. Appl. No. 16/679,055 dated Nov. 12, 2021, pp. 1-34.
Office Communication for U.S. Appl. No. 17/483,435 dated Nov. 30, 2021, pp. 1-21.
International Search Report and Written Opinion for International Patent Application No. PCT/US2021/051757 dated Jan. 11, 2022, pp. 1-9.
"Kerberos Overview—An Authentication Service for Open Network Systems," Cisco Systems, Inc., Jan. 19, 2006, https://www.cisco.com/c/en/us/support/docs/security-vpn/kerberos/16087-1.html, Accessed: Feb. 9, 2022, pp. 1-16.

* cited by examiner

MONITORING ENCRYPTED NETWORK TRAFFIC

CROSS-REFERENCE TO RELATED APPLICATION

This application is a Utility patent application based on previously filed U.S. Provisional Patent Application No. 63/082,262 filed on Sep. 23, 2020, the benefit of the filing date of which is hereby claimed under 35 U.S.C. § 119(e) and the contents of which is further incorporated in entirety by reference.

TECHNICAL FIELD

The present invention relates generally to network monitoring, and more particularly, but not exclusively, to monitoring networks in a distributed network monitoring environment.

BACKGROUND

On most computer networks, bits of data arranged in bytes are packaged into collections of bytes called packets. These packets are generally communicated between computing devices over networks in a wired or wireless manner. A suite of communication protocols is typically employed to communicate between at least two endpoints over one or more networks. The protocols are typically layered on top of one another to form a protocol stack. One model for a network communication protocol stack is the Open Systems Interconnection (OSI) model, which defines seven layers of different protocols that cooperatively enable communication over a network. The OSI model layers are arranged in the following order: Physical (1), Data Link (2), Network (3), Transport (4), Session (5), Presentation (6), and Application (7).

Another model for a network communication protocol stack is the Internet Protocol (IP) model, which is also known as the Transmission Control Protocol/Internet Protocol (TCP/IP) model. The TCP/IP model is similar to the OSI model except that it defines four layers instead of seven. The TCP/IP model's four layers for network communication protocol are arranged in the following order: Link (1), Internet (2), Transport (3), and Application (4). To reduce the number of layers from seven to four, the TCP/IP model collapses the OSI model's Application, Presentation, and Session layers into its Application layer. Also, the OSI's Physical layer is either assumed or is collapsed into the TCP/IP model's Link layer. Although some communication protocols may be listed at different numbered or named layers of the TCP/IP model versus the OSI model, both of these models describe stacks that include basically the same protocols. For example, the TCP protocol is listed on the fourth layer of the OSI model and on the third layer of the TCP/IP model. To assess and troubleshoot communicated packets and protocols over a network, different types of network monitors can be employed. One type of network monitor, a "packet sniffer" may be employed to generally monitor and record packets of data as they are communicated over a network. Some packet sniffers can display data included in each packet and provide statistics regarding a monitored stream of packets. Also, some types of network monitors are referred to as "protocol analyzers" in part because they can provide additional analysis of monitored and recorded packets regarding a type of network, communication protocol, or application.

Generally, packet sniffers and protocol analyzers passively monitor network traffic without participating in the communication protocols. In some instances, they receive a copy of each packet on a particular network segment or VLAN from one or more members of the network segment. They may receive these packet copies through a port mirror on a managed Ethernet switch, e.g., a Switched Port Analyzer (SPAN) port, a Roving Analysis Port (RAP), or the like, or combinations thereof. Port mirroring enables analysis and debugging of network communications. Port mirroring can be performed for inbound or outbound traffic (or both) on single or multiple interfaces. In other instances, packet copies may be provided to the network monitors from a specialized network tap or from a software entity running on the client or server. In virtual environments, port mirroring may be performed on a virtual switch that is incorporated within the hypervisor.

In some instances, a proxy is actively arranged between two endpoints, such as a client device and a server device. The proxy intercepts each packet sent by each endpoint and optionally transforms and forwards the payload to the other endpoint. Proxies often enable a variety of additional services such as load balancing, caching, content filtering, and access control. In some instances, the proxy may operate as a network monitor. In other instances, the proxy may forward a copy of the packets to a separate network monitor.

In some networks, packet capture devices may be installed. Packet capture devices may be arranged to capture and store network packets for subsequent analysis. However, the sheer amount of data communicated over networks may result in a prohibitively high number of network packets. Accordingly, packets and/or portions of packets may be selectively captured to reduce data storage requirements. In addition, as information technology infrastructure becomes more complex and more dynamic, there may be numerous packet types and formats for the various different types of network protocols and applications that may be carried on modern networks that it difficult for effective network packet capture. Further, many modern networks or networked applications are increasingly using one or more cryptographic protocols to enable secure connections. Secure connections are designed to provide cryptographically secure communication. In some cases, the cryptographically secure communication may interfere with network monitoring. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
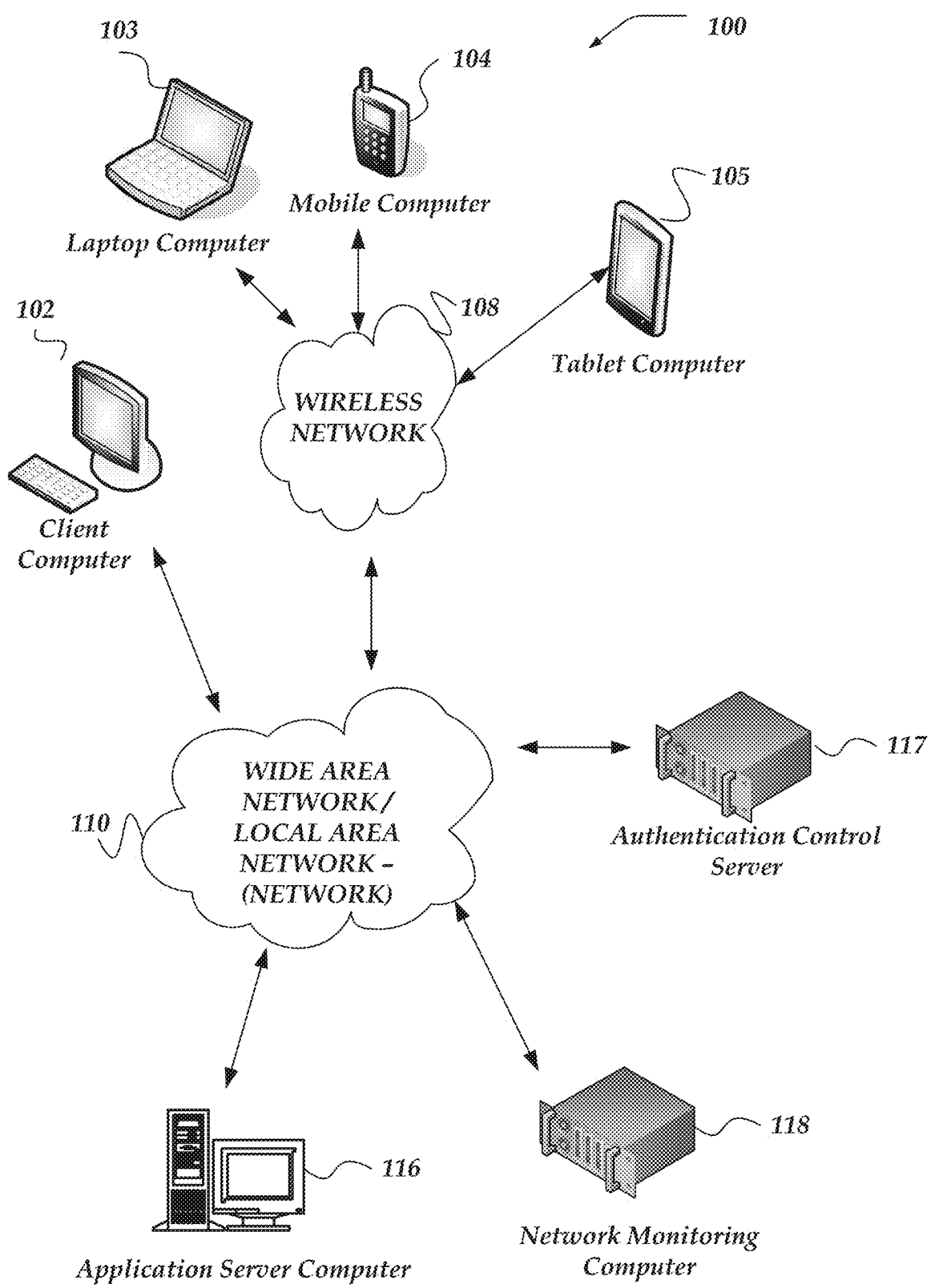
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example, embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, Python, R, Julia, JavaScript, Ruby, VBScript, Microsoft.NET™ languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein, the term "session" refers to a semi-permanent interactive packet interchange between two or more communicating endpoints, such as network devices. A session is set up or established at a certain point in time, and torn down at a later point in time. An established communication session may involve more than one message in each direction. A session may have stateful communication where at least one of the communicating network devices saves information about the session history to be able to communicate. A session may also provide stateless communication, where the communication consists of independent requests with responses between the endpoints. An established session is the basic requirement to perform a connection-oriented communication. A session also is the basic step to transmit in connectionless communication modes.

As used herein, the terms "network connection," and "connection" refer to communication sessions with a semi-permanent connection for interactive packet interchange between two or more communicating endpoints, such as network devices. The connection may be established before application data is transferred, and where a stream of data is delivered in the same or different order than it was sent. The alternative to connection-oriented transmission is connectionless communication. For example, the datagram mode of communication used by the Internet Protocol (IP) and the Universal Datagram Protocol (UDP) may deliver packets out of order, since different packets may be routed independently and could be delivered over different paths. Packets associated with a TCP protocol connection may also be routed independently and could be delivered over different paths. However, for TCP connections the network communication system may provide the packets to application endpoints in the correct order.

Connection-oriented communication may be a packet-mode virtual circuit connection. For example, a transport layer virtual circuit protocol such as the TCP protocol can deliver packets of data in order although the lower layer switching is connectionless. A connection-oriented transport layer protocol such as TCP can also provide connection-oriented communications over connectionless communication. For example, if TCP is based on a connectionless network layer protocol (such as IP), this TCP/IP protocol can then achieve in-order delivery of a byte stream of data, by means of segment sequence numbering on the sender side, packet buffering and data packet reordering on the receiver side. Alternatively, the virtual circuit connection may be established in a datalink layer or network layer switching mode, where all data packets belonging to the same traffic stream are delivered over the same path, and traffic flows are identified by some connection identifier rather than by complete routing information, which enables fast hardware-based switching.

As used herein, the term "network flow" refers to one or more network packets or a stream of network packets that are communicated in a session that is established between at least two endpoints, such as two network devices. In one or more of the various embodiments, flows may be useful if one or more of the endpoints of a session may be behind a network traffic management device, such as a firewall, switch, router, load balancer, or the like. In one or more of the various embodiments, such flows may be used to ensure that the packets sent between the endpoints of a flow may be routed appropriately.

Typically, establishing a TCP based connection between endpoints begins with the execution of an initialization protocol and creates a single bi-directional flow between two endpoints, e.g., one direction of flow going from endpoint A to endpoint B, the other direction of the flow going from endpoint B to endpoint A, where each endpoint is at least identified by an IP address and a TCP port.

Also, some protocols or network applications may establish a separate flow for control information that enables management of at least one or more flows between two or more endpoints. Further, in some embodiments, network flows may be half-flows that may be unidirectional.

As used herein, the term "tuple" refers to a set of values that identify a source and destination of a network packet, which may, under some circumstances, be a part of a network connection. In one embodiment, a tuple may include a source Internet Protocol (IP) address, a destination IP address, a source port number, a destination port number, virtual LAN segment identifier (VLAN ID), tunnel identifier, routing interface identifier, physical interface identifier, or a protocol identifier. Tuples may be used to identify network flows (e.g., connection flows).

As used herein, the term "related flows," or "related network flows" as used herein are network flows that while separate they are operating cooperatively. For example, some protocols, such as, FTP, SIP, RTP, VOIP, custom protocols, or the like, may provide control communication over one network flow and data communication over other network flows. Further, configuration rules may define one or more criteria that are used to recognize that two or more network flows should be considered related flows. For example, configuration rules may define that flows containing a particular field value should be grouped with other flows having the same field value, such as, a cookie value, or the like. In cases, related flows may be flows in different networks or network segments that may be associated the same user, application, client computer, source, destination, or the like.

As used herein, the terms "network monitor", "network monitoring computer", or "NMC" refer to an application (software, hardware, or some combination) that is arranged to monitor and record flows of packets in a session that are communicated between at least two endpoints over at least one network. The NMC can provide information for assessing different aspects of these monitored flows. In one or more embodiments, the NMC may passively monitor network packet traffic without participating in the communication protocols. This monitoring may be performed for a variety of reasons, including troubleshooting and proactive remediation, anomaly detection, end-user experience monitoring, SLA monitoring, capacity planning, application lifecycle management, infrastructure change management, infrastructure optimization, business intelligence, security, and regulatory compliance. The NMC can receive network communication for monitoring through a variety of means including network taps, wireless receivers, port mirrors or directed tunnels from network switches, clients or servers including the endpoints themselves, or other infrastructure devices. In at least some of the various embodiments, the NMC may receive a copy of each packet on a particular network segment or virtual local area network (VLAN). Also, for at least some of the various embodiments, they may receive these packet copies through a port mirror on a managed Ethernet switch, e.g., a Switched Port Analyzer (SPAN) port, a Roving Analysis Port (RAP), or the like, or combination thereof. Port mirroring enables analysis and debugging of network communications. Port mirroring can be performed for inbound or outbound traffic (or both) on single or multiple interfaces.

The NMC may track network connections from and to end points such as a client or a server. The NMC may also extract information from the packets including protocol information at various layers of the communication protocol stack. The NMC may reassemble or reconstruct the stream of data exchanged between the endpoints. The NMC may perform decryption of the payload at various layers of the protocol stack. The NMC may passively monitor the network traffic or it may participate in the protocols as a proxy. The NMC may attempt to classify the network traffic according to communication protocols that are used.

The NMC may also perform one or more actions for classifying protocols that may be a necessary precondition for application classification. While some protocols run on well-known ports, others do not. Thus, even if there is traffic on a well-known port, it is not necessarily the protocol generally understood to be assigned to that port. As a result, the NMC may perform protocol classification using one or more techniques, such as, signature matching, statistical analysis, traffic analysis, and other heuristics. In some cases, the NMC may use adaptive protocol classification techniques where information used to classify the protocols may be accumulated or applied over time to further classify the observed protocols. In some embodiments, NMCs may be arranged to employ stateful analysis. Accordingly, for each supported protocols, an NMC may use network packet payload data to drive a state machine that mimics the protocol state changes in the client/server flows being monitored. The NMC may categorize the traffic where categories might include file transfers, streaming audio, streaming video, database access, interactive, gaming, and the like. The NMC may attempt to determine whether the traffic corresponds to known communications protocols, such as HTTP, SMTP, NTML, FTP, SMTP, RTP, TDS, TCP, IP, and the like.

In addition, in one or more of the various embodiments, NMCs or NMC functionality may be implemented using hardware or software-based proxy devices that may be arranged to intercept network traffic in the monitored networks rather than being restricted to passive (pass through) monitoring.

As used herein, the terms "layer" and "model layer" refer to a layer of one or more communication protocols in a stack of communication protocol layers that are defined by a model, such as the OSI model and the TCP/IP (IP) model. The OSI model defines seven layers and the TCP/IP model defines four layers of communication protocols.

For example, at the OSI model's lowest or first layer (Physical), streams of electrical/light/radio impulses (bits) are communicated between computing devices over some type of media, such as cables, network interface cards, radio wave transmitters, and the like. At the next or second layer (Data Link), bits are encoded into packets and packets are also decoded into bits. The Data Link layer also has two sub-layers, the Media Access Control (MAC) sub-layer and the Logical Link Control (LLC) sub-layer. The MAC sub-layer controls how a computing device gains access to the data and permission to transmit it. The LLC sub-layer controls frame synchronization, flow control and error checking. At the third layer (Network), logical paths are created, known as virtual circuits, to communicated data from node to node. Routing, forwarding, addressing, inter-networking, error handling, congestion control, and packet sequencing are functions of the Network layer. At the fourth layer (Transport), transparent transfer of data between end computing devices, or hosts, is provided. The Transport layer is responsible for end-to-end recovery and flow control to ensure complete data transfer over the network.

At the fifth layer (Session) of the OSI model, connections between applications are established, managed, and terminated. The Session layer sets up, coordinates, and terminates conversations, exchanges, and dialogues between applications at each end of a connection. At the sixth layer (Presentation), independence from differences in data representation, e.g., encryption, is provided by translating from application to network format and vice versa. Generally, the Presentation layer transforms data into the form that the protocols at the Application layer (7) can accept. For example, the Presentation layer generally handles the formatting and encrypting/decrypting of data that is communicated across a network.

At the top or seventh layer (Application) of the OSI model, application and end user processes are supported. For example, communication partners may be identified, quality of service can be identified, user authentication and privacy may be considered, and constraints on data syntax can be identified. Generally, the Application layer provides services for file transfer, messaging, and displaying data. Protocols at the Application layer include FTP, HTTP, and Telnet.

To reduce the number of layers from seven to four, the TCP/IP model collapses the OSI model's Application, Presentation, and Session layers into its Application layer. Also, the OSI's Physical layer is either assumed or may be collapsed into the TCP/IP model's Link layer. Although some communication protocols may be listed at different numbered or named layers of the TCP/IP model versus the OSI model, both of these models describe stacks that include basically the same protocols.

As used herein, the term "entity" refers to an actor in the monitored network. Entities may include applications, services, programs, processes, network devices, network computers, client computers, or the like, operating in the monitored network. For example, individual entities may include, web clients, web servers, database clients, database servers, mobile app clients, payment processors, groupware clients, groupware services, or the like. In some cases, multiple entities may co-exist on or in the same network computer, process, application, compute container, or cloud compute instance.

As used herein, the term "observation port" refers to network taps, wireless receivers, port mirrors or directed tunnels from network switches, clients or servers, virtual machines, cloud computing instances, other network infrastructure devices or processes, or the like, or combination thereof. Observation ports may provide a copy of each network packet included in wire traffic on a particular network segment or virtual local area network (VLAN). Also, for at least some of the various embodiments, observation ports may provide NMCs network packet copies through a port mirror on a managed Ethernet switch, e.g., a Switched Port Analyzer (SPAN) port, or a Roving Analysis Port (RAP).

As used herein, the term "centralized security protocol" refers to a network security protocol that relies on a central coordinating system. In some cases, this may include one or more servers that have cryptographic keys for each participant (e.g., clients, servers, users, services, or the like). Thus, while participants may exchange information including ephemeral keys or key material, the central servers maintain master keys for each participant.

As used herein, the terms "authentication control server," or "control server" refer to servers that host one or more control/management processes that implement or otherwise provide a centralized security protocol. Authentication control servers may store long lived keys for entities that it protects as well as itself.

As used herein, the term "client" refers to computers, users, services, applications, or the like, that may be attempting to access resources protected by a centralized security protocol. For brevity and clarity, the term client is used herein to represent entities that intend access protected resources in the protected network. In some cases, clients may become servers if they provide or offer services/resources to other entities.

As used herein, the term "server," or "resource server" refers to computers, users, services, applications, or the like, that may offer or provide resources in a network protected using a centralized security protocol. For brevity and clarity, the term server or resource server is used herein to represent the various entities that provide protected resources in the protected network. In some cases, servers may become clients if they request services/resources from other entities.

As used herein the term, "control key" refers to a long-lived (e.g., not ephemeral) cryptographic key that authentication control servers use to encrypt portions of the centralized security protocol network traffic. Control keys may be restricted to the authentication control servers for centralized security protocols.

As used herein, the term "client key" refers to long-lived (e.g., not ephemeral) cryptographic keys that clients may use to encrypt portions of the network traffic as part of a centralized security protocol. Authentication control servers may distribute client keys to each client participating in the centralized security protocol. Note, authentication control servers may keep copies of the client keys used by its clients.

As used herein. the term "server key" refers to long-lived (e.g., not ephemeral) cryptographic keys that servers may use to encrypt portions of the network traffic as part of a centralized security protocol. Authentication control servers may distribute server keys to each server participating in the centralized security protocol. Note, authentication control servers may keep copies of the server keys used by its clients.

As used herein, the term "authentication key" refers to a data structure that may be encrypted by a control key of an authentication control server as part of a centralized security protocol. Authentication keys may be provided to entities as per the centralized security protocol, or the like. In some cases, clients or servers may treat the encrypted data structure as an opaque key because access to the control key required to decrypt the authentication key may be restricted to the authentication control server.

As used herein, the term "session key" refers to a temporary cryptographic key that may be part of a centralized security protocol. Session keys may be generated by authentication control servers if a client may be authenticated by the authentication control server. Clients may keep a copy of the session key which may be reused as part of a centralized security protocol to access servers protected by the centralized security protocol.

As used herein, the term "service session key" refers to a cryptographic key exchanged between a client and server as part of a centralized security protocol. The service session keys may be used to authentication network traffic from clients or servers absent the intervention of an authentication control server.

As used herein the term, "authentication request" refers to a message sent by a client to authenticate itself with an authentication control server as part of a centralized security protocol. Typically, such requests may include information about the client encrypted using its client key.

As used herein the term, "authentication response" refers to a message sent by an authentication control server to a client in response to an authentication request from the client. Typically, among other things, the client may receive an authentication key in the authentication response.

As used herein the term, "access request" refers to a message sent by a client to an authentication control server to request access to a protected server. Among other things, access requests may include valid authentication keys previously provided by authentication control servers that protect the network.

As used herein the term, "access response" refers to messages sent by authentication control servers to clients in response to access requests. If a client is granted access to a server by an authentication control server, the access response may include a service session key.

As used herein the term, "server request" refers to a message sent by a client to obtain services or resources from a server that may be protected by a centralized security protocol. Among other things, server requests may include the server session key that enable the server to validate that the authentication control server has authenticated the client prior to the client sending the server request.

As used herein the term, "server response" refers to a message sent by a server to a client in response to a server request. Server responses may include portions that are encrypted by a service session key which enables clients to validate the serve response.

As used herein the term, "correlation information" refers to information that may be used to correlate key information with particular flows, sessions, or connections, or the like. Correlation information may include various values that may be associated with a flow, such as, tuple information, client/server random numbers, handshake hashes, date-time information, timestamps, or the like, or combination thereof. Generally, correlation information may be information that a NMC may determine or observe without using the key information or decrypting the encrypted network traffic. Correlation information is stored in a key escrow with its corresponding key information.

As used herein the term, "configuration information" refers to information that may include rule-based policies, pattern matching, scripts (e.g., computer readable instructions), or the like, that may be provided from various sources, including, configuration files, databases, user input, built-in defaults, or the like, or combination thereof. In some cases, configuration information may include or reference information stored in other systems or services, such as, configuration management databases, Lightweight Directory Access Protocol (LDAP) servers, name services, public key infrastructure services, or the like.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed monitoring network traffic using one or more network monitoring computers. In some embodiments, networks may be configured to protected one or more entities or resources using centralized security protocols. In some embodiments, centralized security protocols may depend on a centralized control provided by authentication control servers. In one or more of the various embodiments, if a client intends to access protected servers, the client may provide an authentication request to an authentication control server to obtain an authentication key and session key that may be enable to request to access one or more servers. Accordingly, in some embodiments, NMCs may be arranged to monitor the network traffic associated with the authentication request provided by clients and the authentication response provided by authentication control servers.

In one or more of the various embodiments, if the client intends to access a particular server in the protected network it may generate an access request that may be sent to the authentication control server. Accordingly, in some embodiments, the NMC may be arranged to monitor the network traffic associated with the access request.

In one or more of the various embodiments, if the authentication control server is able to authenticate the client and validate its access request, the authentication control server my generate an access response that may be sent to the client. Accordingly, in some embodiments, the NMC may be arranged to monitor the network traffic associated with the access response.

In one or more of the various embodiments, if the client receives an access response that enables it to access the server, the client may generate a server request that it may send to the server. Accordingly, in some embodiments, the NMC may be arranged to monitor the network traffic associated with the server request.

In one or more of the various embodiments, if the server validates the client server request, the server may generate a server response that includes information that enables the client and server to communicate with each other.

Further, in one or more of the various embodiments, monitoring communication over a network between one or more computers may include providing a control server that distributes one or more client keys to the one or more computers such that the one or more computers are one or more of a client or a resource server.

In one or more of the various embodiments, in response to determining network traffic that may be associated with a request from the client to access the resource server, further actions may be performed, including: monitoring a first communication between the client and the control server that authenticates the client with the control server and authenticates the control server with the client such that a portion of the first communication may be encrypted with a client key associated with the client and such that the client may be provided an authentication token associated with the control server; in one or more of the various embodiments, monitoring a second communication between the client and the control server that may include a request to access the resource server such that a portion of the second communication may be encrypted with one or more of the client key or the authentication token and such that the control server may provide an access token to the client that may enable the client to access the resource server; in one or more of the various embodiments, monitoring other communication between the client and the resource server that may include the access token such that one or more portions of the other communication may be encrypted with one or more of the access token or one or more other keys derived from one or more of the access token or one or more other portions of the other communication, and such that the other communication enables the client to access the resource server; generating one or more metrics based on the network traffic associated with one or more of the first communication, the second communication, or the other communication; generating one or more reports that may include information associated with one or more of the client, the resource server, or the control server; or the like.

In one or more of the various embodiments, the one or more keys may be provided to the NMC. In some embodiments, the one or more keys may be employed to decrypt one or more portions of one or more of the first communication, the second communication, or the other communication. And, in some embodiments, the one or more metrics may be updated based on the one or more decrypted portions of the one or more of the first communication, the second communication, or the other communication.

In one or more of the various embodiments, one or more sharing agents may be provided to the one or more computers. In some embodiments, one or more of the client key, the authentication token, or the access token may be determined based on information provided by the one or more sharing agents. In one or more of the various embodiments, the one or more of the client key, the authentication token, or the access token may be employed to decrypt one or more portions of one or more of the first communication, the second communication, or the other communication. And, in one or more of the various embodiments, the one or more metrics may be updated based on the one or more decrypted portions of the one or more of the first communication, the second communication, or the other communication.

In one or more of the various embodiments, monitoring the first communication between the client and the control server may include: generating a portion of the one or more metrics based on one or more characteristics of the network traffic associated the first communication such that the portion of the one or more metrics based on one or more non-encrypted portions of the network traffic. In one or more of the various embodiments, a second portion of the one or more metrics may be generated based on one or more other characteristics of the network traffic associated the second communication such that the second portion of the one or more metrics is based on one or more other non-encrypted portions network traffic. And, in one or more of the various embodiments, the second communication may be correlated with the first communication based on the first portion of the one or more metrics and the second portion of the one or more metrics.

In one or more of the various embodiments, generating the one or more metrics based on the network traffic associated with the first communication, the second communication, or the other communication, may include: determining one or more characteristics that may be associated with one or more of the first communication, the second communication, or the other communication based on one or more portions of non-encrypted network traffic such that the one or more characteristics may include one or more of time of transmission, packet size, latency, source client, target resource server, tuple information, application protocol, or the like; in one or more of the various embodiments, determining one or more anomalous characteristics based on one or more values associated with the one or more characteristics such that the one or more values exceed one or more threshold values or violate one or more policies and such that the one or more anomalous characteristics include one or more of anomalous amount of time for a communication, an anomalous packet size, an anomalous latency, an anomalous source client, an anomalous target resource server, anomalous tuple information, or an anomalous application protocol. And, in one or more of the various embodiments, updating the one or more metrics based on the one or more anomalous characteristics.

In one or more of the various embodiments, one or more application protocols employed for one or more of the first communication, the second communication, or the other communication may be determined based on one or more characteristics of the network traffic associated with the one or more of the first communication, the second communication, or the other communication. And, in one or more of the various embodiments, one or more portions of the one or more metrics may be generated based on one or more portions of the first communication, the second communication, or the other communication that may be included in payload network traffic associated with the one or more application protocols.

Also, in one or more of the various embodiments, the first communication, the second communication, and the other communication may conform to a Kerberos-based authentication protocol.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)-(network) 110, wireless network 108, client computers 102-105, application server computer 116, authentication control server 117, network monitoring computer 118, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CS S), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, application server computer 116, authentication control server 117, network monitoring computer 118, or other computers.

Client computers 102-105 may further be configured to include a client application that enables an end-user to log into an end-user account that may be managed by another computer, such as application server computer 116, authentication control server 117, network monitoring computer 118, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Further, client computers may be arranged to enable users to provide configuration information, policy information, or the like, to network monitoring computer 118. Also, client computers may be arranged to enable users to display reports, interactive user-interfaces, results provided by network monitor computer 118, or the like. Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, application server computer 116, authentication control server 117, network monitoring computer 118, client computers 102-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information using one or more network protocols, such Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

One embodiment of application server computer 116, authentication control server 117, network monitoring computer 118 is described in more detail below in conjunction with FIG. 3. Although FIG. 1 illustrates application server computer 116, authentication control server 117, and network monitoring computer 118, each as a single computer, the innovations or embodiments are not so limited. For example, one or more functions of application server computer 116, authentication control server 117, network monitoring computer 118, or the like, may be distributed across one or more distinct network computers. Moreover, in one or more embodiment, network monitoring computer 118 may be implemented using a plurality of network computers. Further, in one or more of the various embodiments, application server computer 116, authentication control server 117, or network monitoring computer 118 may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
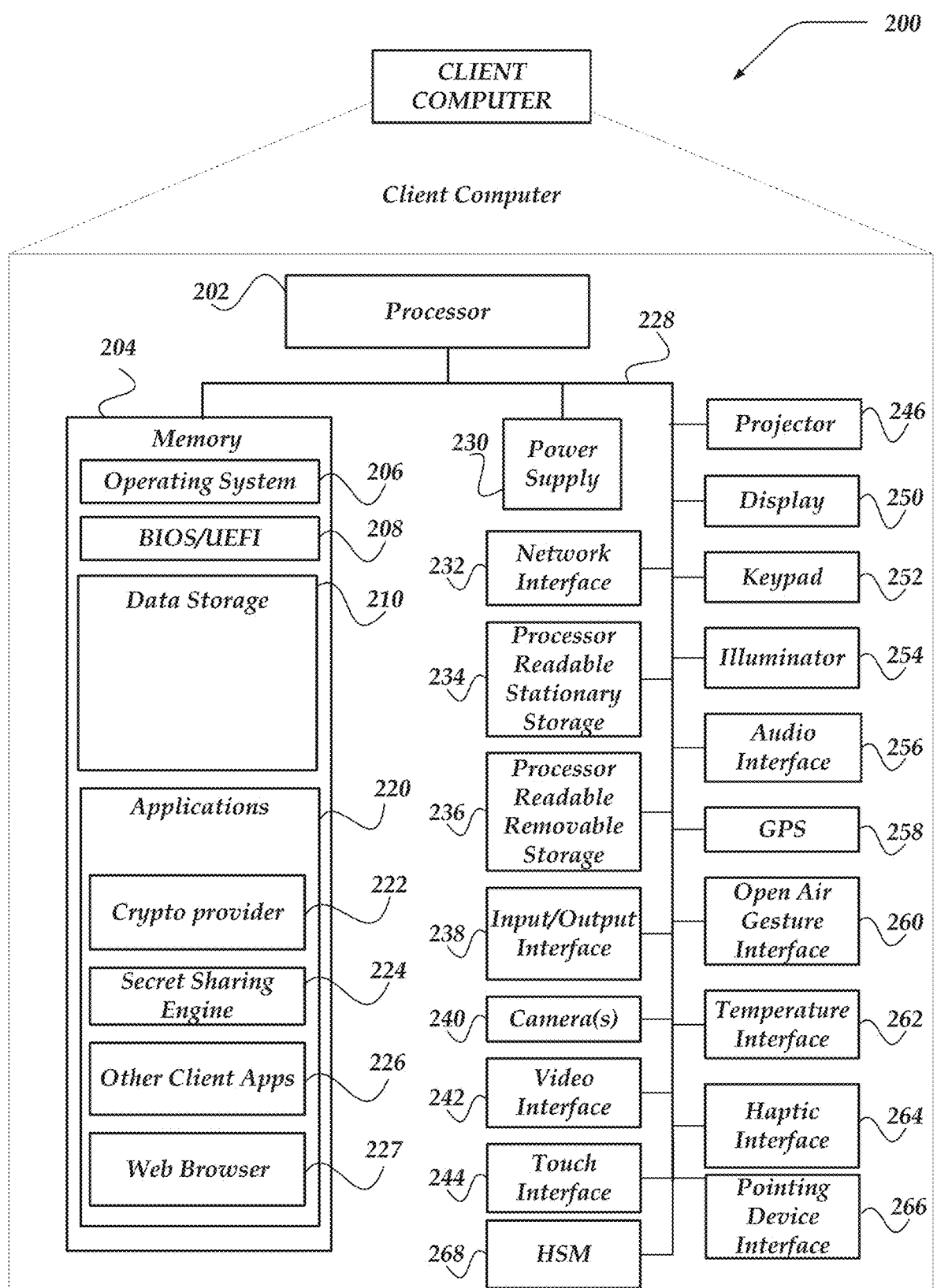
FIG. 2 illustrates a schematic embodiment of a client computer.

FIG. 2 shows one embodiment of client computer 200 that may include many more or less components than those shown. Client computer 200 may represent, for example, at least one embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 for measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiment, however, client computer 200 may, through other components, provide other information that may be employed to determine a physical location of the client computer, including for example, a Media Access Control (MAC) address, IP address, and the like.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 227 that is configured to receive and to send web pages, web-based messages, graphics, text, multimedia, and the like. The client computer's browser application may employ virtually any programming language, including a wireless application protocol messages (WAP), and the like. In one or more embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or Linux®, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, crypto provider 222, secret sharing engine 224, other client applications 226, web browser 227, or the like. Client computers may be arranged to exchange communications, such as, queries, searches, messages, notification messages, event messages, alerts, performance metrics, log data, API calls, or the like, combination thereof, with application servers or network monitoring computers. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include one or more embedded logic hardware devices instead of CPUs, such as, an Application Specific Integrated Circuit (ASIC), Field Programmable Gate Array (FPGA), Programmable Array Logic (PAL), or the like, or combination thereof. The embedded logic hardware devices may directly execute embedded logic to perform actions. Also, in one or more embodiments (not shown in the figures), client computer 200 may include one or more hardware microcontrollers instead of CPUs. In one or more embodiments, the microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Network Computer

Figure 3:
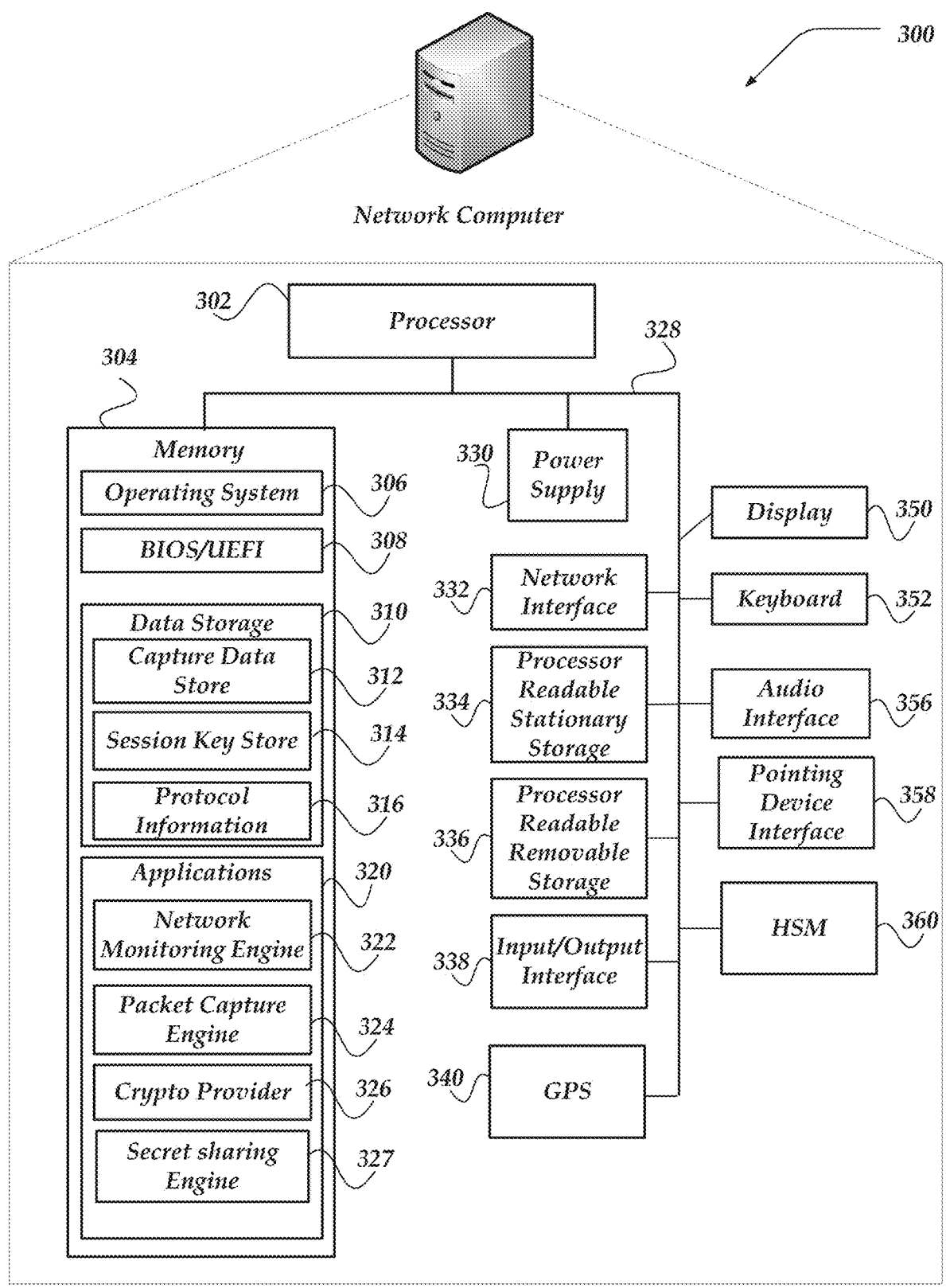
FIG. 3 illustrates a schematic embodiment of a network computer.

FIG. 3 shows one embodiment of network computer 300 that may be included in a system implementing at least one of the various embodiments. Network computer 300 may include many more or less components than those shown in FIG. 3. However, the components shown are sufficient to disclose an illustrative embodiment for practicing these innovations. Network computer 300 may represent, for example, one embodiment of at least one of application server computer 116, authentication control server 117, or network monitoring computer 118 of FIG. 1.

As shown in the figure, network computer 300 includes a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Realtime Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiment, however, network computer 300 may, through other components, provide other information that may be employed to determine a physical location of the client computer, including for example, a Media Access Control (MAC) address, IP address, and the like.

In at least one of the various embodiments, applications, such as, operating system 306, network monitoring engine 322, honeypot engine 324, classification engine 326, web services 329, or the like, may be arranged to employ geo-location information to select one or more localization features, such as, time zones, languages, currencies, calendar formatting, or the like. Localization features may be used when interpreting network traffic, monitoring application protocols, user-interfaces, generating reports, as well as internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or Linux®, or a specialized operating system such as Microsoft Corporation's Windows® operating system, or the Apple Corporation's macOS® operating system. The operating system may include, or interface with a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, capture data store 312, session key storage 314, protocol information 316, or the like. In some embodiments, capture data store 312 may be a data store that stores captured packets or related information. In some embodiments, session key store 314 may be data store for storing cryptographic session key. And, in some embodiments, protocol information 316 may store various rules or configuration information related to one or more network communication protocols, including application protocols, secure communication protocols, client-server protocols, peer-to-peer protocols, shared file system protocols, protocol state machines, or the like, that may be employed for protocol analysis, entity auto-discovery, anomaly detection, or the like, in a monitored network environment.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include network monitoring engine 322, packet capture engine 324, crypto provider engine 326, secret sharing engine 327, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, network monitoring engine 322, packet capture engine 324, crypto provider engine 326, secret sharing engine 327, or the like, may be operative in a cloud-based computing environment. In one or more of the various embodiments, these applications, and others, that comprise a network monitoring computer may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to network monitoring engine 322, packet capture engine 324, crypto provider engine 326, secret sharing engine 327, or the like, may be provisioned and de-commissioned automatically.

Also, in one or more of the various embodiments, network monitoring engine 322, honeypot engine 324, classification engine 326, web services 329, or the like, may be located in virtual servers running in a cloud-based computing environment rather than being tied to one or more specific physical network computers. Likewise, in some embodiments, one or more of network monitoring engine 322, packet capture engine 324, crypto provider engine 326, secret sharing engine 327, or the like, may be configured to execute in a container-based environment.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include one or more embedded logic hardware devices instead of CPUs, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of CPUs. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
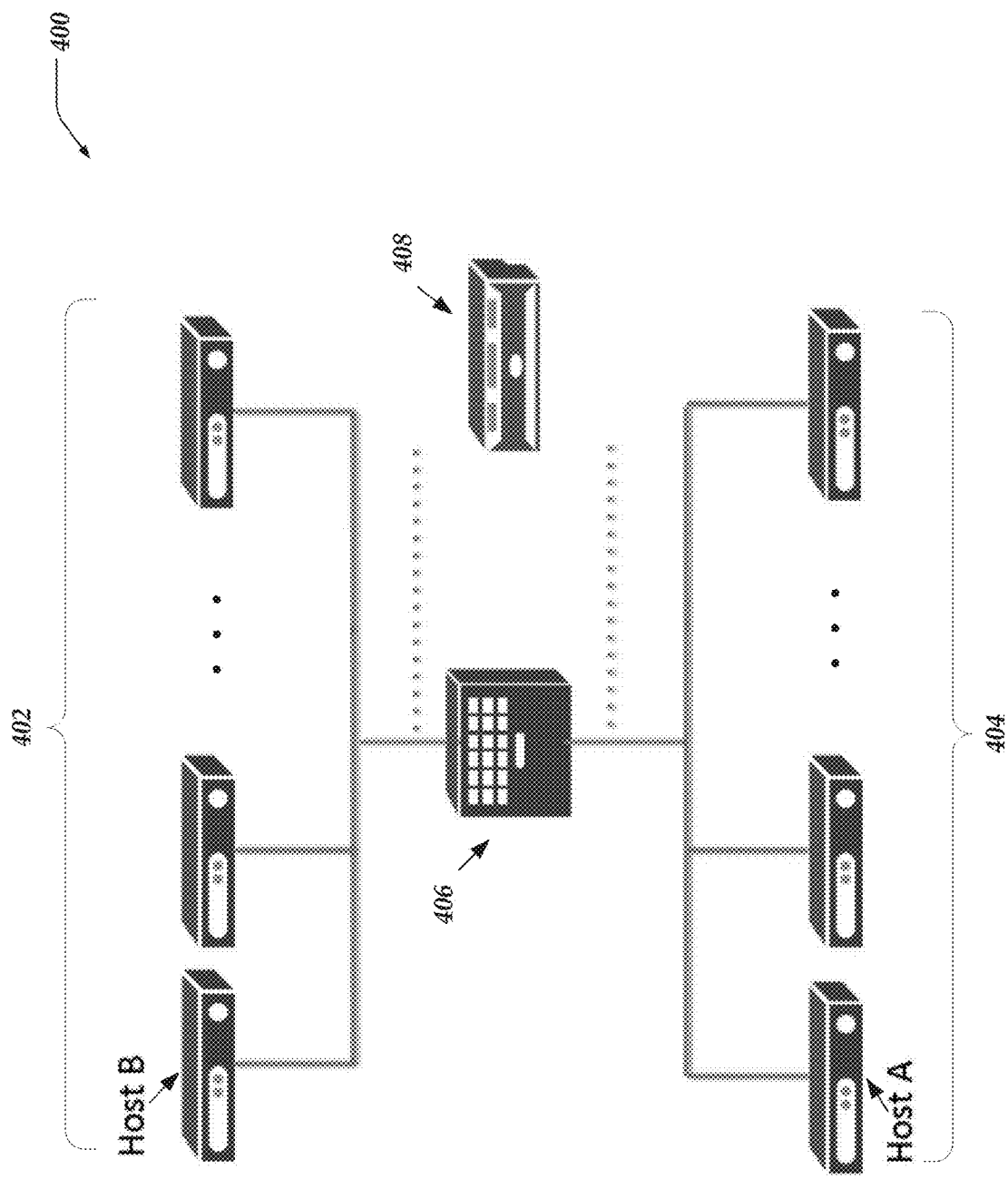
FIG. 4 illustrates a logical architecture of a system for monitoring encrypted network traffic in with one or more of the various embodiments.

FIG. 4 illustrates a logical architecture of system 400 for monitoring encrypted network traffic in with one or more of the various embodiments. System 400 may be arranged to include a plurality of network devices or network computers on first network 402 and a plurality of network devices or network computers on second network 404. In this example, communication between the first network and the second network is managed by switch 406. Also, NMC 408 may be arranged to passively monitor or record packets (network traffic) that are communicated in network flows between network devices or network computers on first network 402 and second network 404. For example, the communication of flows of packets between the Host B network computer and the Host A network computer are managed by switch 406 and NMC 408 may be passively monitoring and recording some or all of the network traffic comprising these flows.

NMC 408 may be arranged to receive network communication for monitoring through a variety of means including network taps, wireless receivers, port mirrors or directed tunnels from network switches, clients or servers including the endpoints themselves, virtual machine, cloud computing instances, other network infrastructure devices, or the like, or combination thereof. In at least some of the various embodiments, the NMC may receive a copy of each packet on a particular network segment or virtual local area network (VLAN). Also, for at least some of the various embodiments, NMCs may receive these packet copies through a port mirror on a managed Ethernet switch, e.g., a Switched Port Analyzer (SPAN) port, or a Roving Analysis Port (RAP). Port mirroring enables analysis and debugging of network communications. Port mirroring can be performed for inbound or outbound traffic (or both) on single or multiple interfaces. For example, in some embodiments, NMCs may be arranged to receive electronic signals over or via a physical hardware sensor that passively receives taps into the electronic signals that travel over the physical wires of one or more networks.

Figure 5:
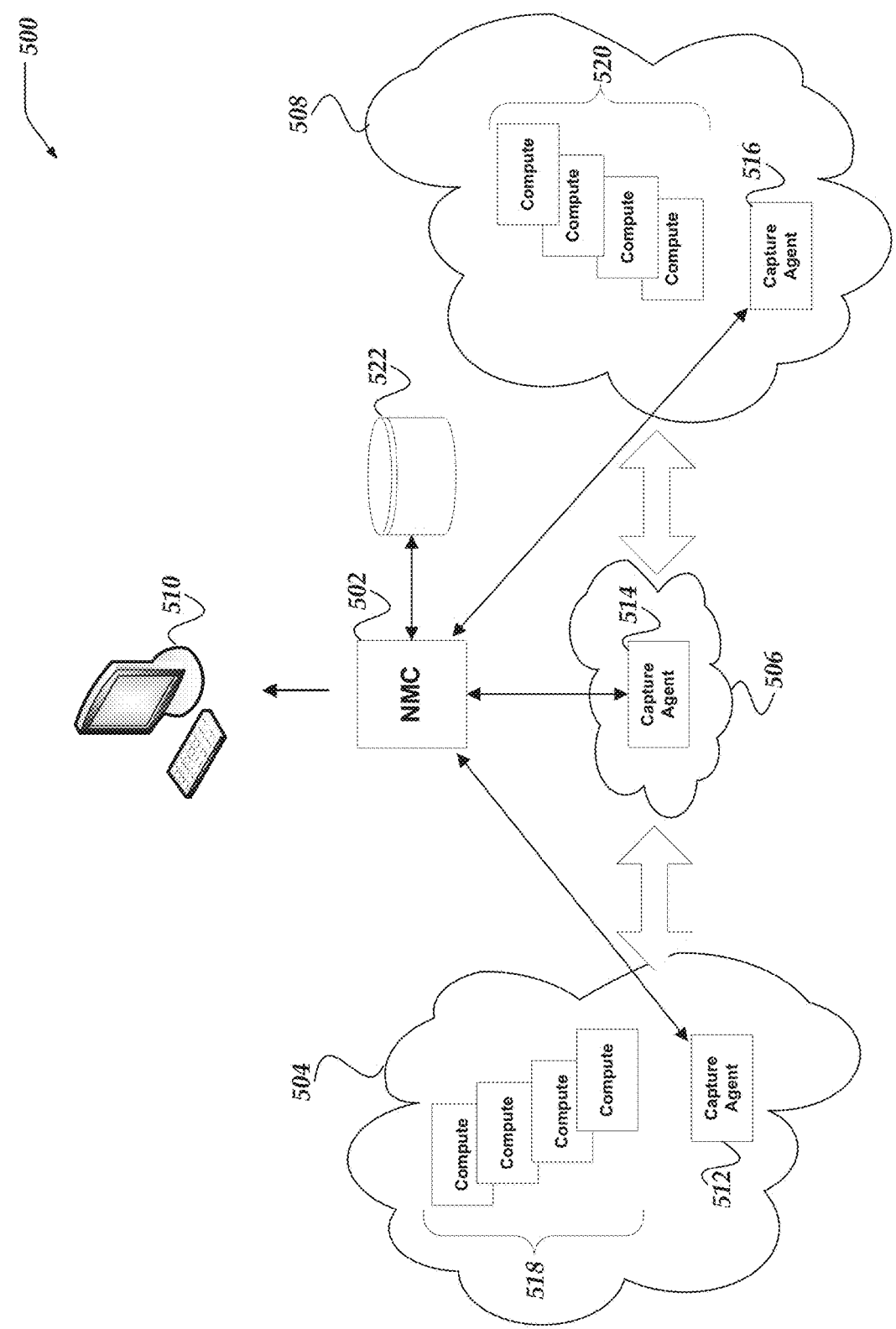
FIG. 5 illustrates a logical schematic of a system for monitoring encrypted network traffic in accordance with one or more of the various embodiments.

FIG. 5 illustrates a logical schematic of system 500 for monitoring encrypted network traffic in accordance with one or more of the various embodiments. In one or more of the various embodiments, an NMC, such as NMC 502 may be arranged to monitor network traffic in one or more networks, such as, network 504, network 506, or network 508. In this example, network 504, network 506, or network 508 may be considered similar to network 108 or network 110. Also, in some embodiments, one or more of network 504, network 506, or network 508 may be considered cloud computing environments. Likewise, in some embodiments, one or more of network 504, network 506, or network 508 may be considered remote data centers, local data centers, co-location computing environments, or the like, or combination thereof.

In one or more of the various embodiments, NMCs, such as NMC 502 may be arranged to communicate with one or more capture agents, such as, capture agent 512, capture agent 514, or capture agent 514. In some embodiments, capture agents may be arranged to selectively capture network traffic or collect network traffic metrics that may be provided to NMC 502 for additional analysis.

In one or more of the various embodiments, capture agents may be NMCs that are distributed in various networks or cloud environments. For example, in some embodiments, a simplified system may include one or more NMCs that also provide capture agent services. In some embodiments, capture agents may be NMCs arranged to instantiate one or more capture engines to perform one or more capture or collection actions. Similarly, in one or more of the various embodiments, one or more capture agents may be instantiated or hosted separately from one or more NMCs.

In one or more of the various embodiments, capture agents may be selectively installed such that they may capture metrics for selected portions of the monitored networks. Also, in some embodiments, in networks that have groups or clusters of the same or similar entities, capture agents may be selectively installed on one or more entities that may be representative of entire groups or clusters of similar entities. Thus, in some embodiments, capture agents on the representative entities may collect metrics or traffic that may be used to infer the metrics or activity associated with similarly situated entities that do not include a capture agent.

Likewise, in one or more of the various embodiments, one or more capture agents may be installed or activated for a limited time period to collect information that may be used to infer activity information about the monitored networks. Accordingly, in one or more of the various embodiments, these one or more capture agents may be removed or de-activated if sufficient activity information or network traffic has been collected.

In one or more of the various embodiments, system 500 may include one or more network entities, such as, entities 518, entities 520, or the like, that communicate in or over one or more of the monitored networks. Entities 518 and entities 520 are illustrated here as cloud environment compute instances (e.g., virtual machines), or the like. However, one of ordinary skill in the art will appreciate that entities may be considered to be various network computers, network appliances, routers, switches, applications, services, containers, or the like, subject to network monitoring by one or more NMCs. (See, FIG. 4, as well).

In this example, for one or more of the various embodiments, capture agents, such as capture agent 512 may be arranged capture network traffic or network traffic metrics associated with one or more entities, such as, entities 518. Accordingly, in some embodiments, some or all of the information captured by capture agents may be provided to one or more NMCs, such as, NMC 502 for additional analysis. Also, in one or more of the various embodiments, capture agents or NMCs may be arranged to selectively store network traffic in a captured data store, such as, captured data store 522.

Figure 6:
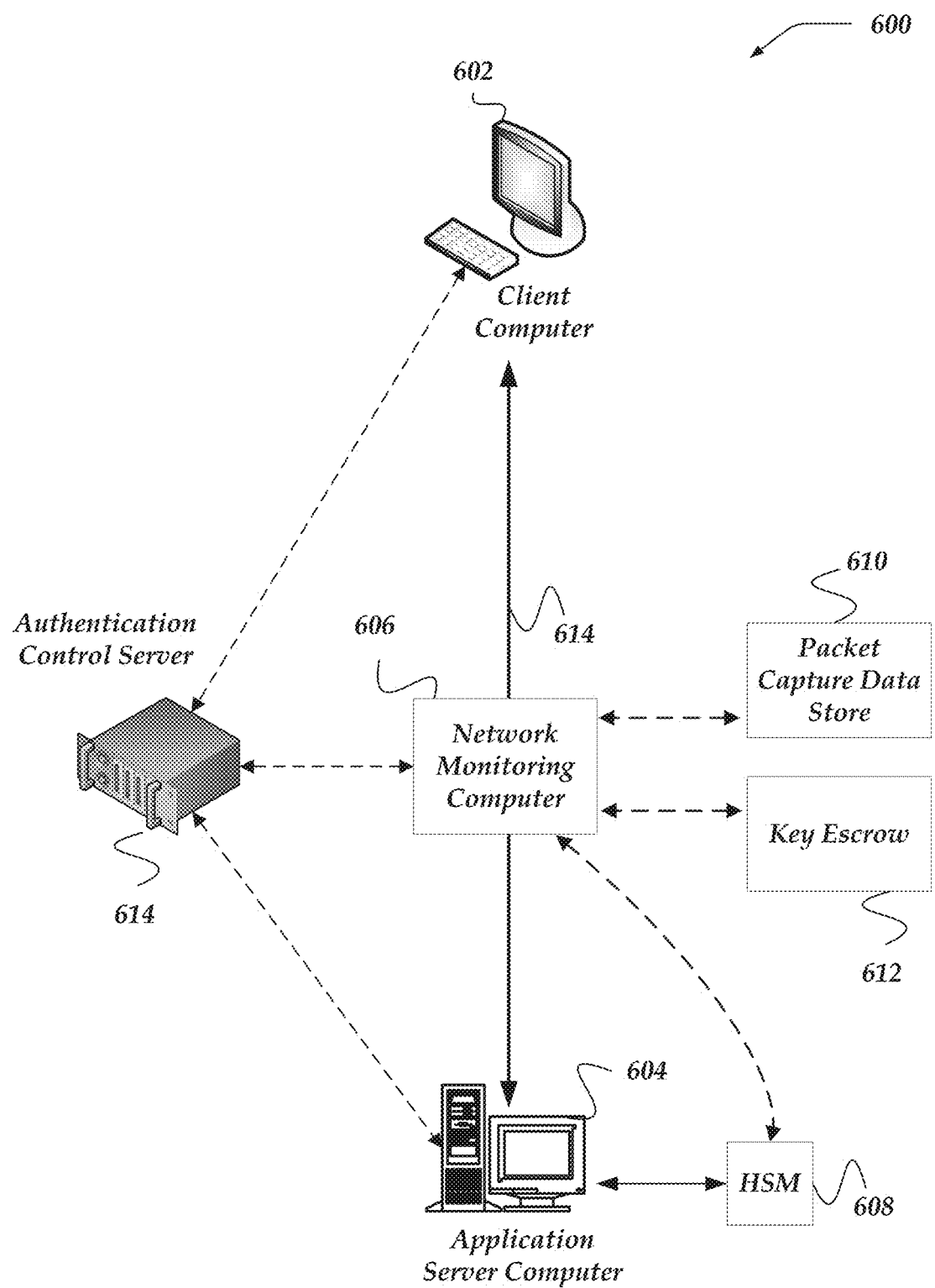
FIG. 6 illustrates a logical architecture of a system for monitoring encrypted network traffic in accordance with at least one of the various embodiments.

FIG. 6 illustrates a logical architecture of system 600 for monitoring encrypted network traffic in accordance with at least one of the various embodiments. In at least one of the various embodiments, system 600 may comprise client computer 602, application server computer 604, network monitoring device 606, optionally, hardware security module 608, packet capture data store 610, key information escrow 612, authentication control server 614, or the like.

In at least one of the various embodiments, client computer 602 may be a computer that has one or more applications that may be arranged to securely communicate with application server computer 604 over network path 614.

Secure communication may be comprised of one or more cryptographically secure network communication protocols that employ centralized key management, including, Kerberos, or the like. For example, in some embodiments, client computer 602 may be hosting a web browser that is securely accessing a website that is served by a web server running on application server computer 604. Another non-limiting example may include client computer 602 accessing an application running on application server computer 604 over a secure network. As described above, NMC 606 may be arranged to passively monitor the network packets passing through network path 614. Accordingly, NMC 606 may be arranged to monitor the network traffic comprising communication between client computer 602 and application server computer 604.

In one or more of the various embodiments, secured network traffic may include traffic based on protocols that embed or wrap a security protocol that relies on centralized key management. Accordingly, in some embodiments, one or more portions of the monitored network traffic may remain unencrypted with one or more other portions of the network traffic secured by the centralized security protocol. For example, in some embodiments, the network traffic may be exchanged using HTTP with the payload or data portions of the network traffic encrypted using the centralized security protocol. Thus, for example, some or all of the headers or fields comprising HTTP requests or HTTP responses may be in the clear while the payloads may be encrypted.

In at least one of the various embodiments, application server computer 604 may employ a network hardware security module, such as, HSM 608 to provide one or more cryptographic services that may be employed to perform secure communication with client computer 602. For example, HSM 608 may be used to generate or store cryptographic keys (including session keys) for establishing secure communication with clients, such as, client computer 602.

In at least one of the various embodiments, client applications and server applications running on client computers, such as, client computer 602 and/or server computers, such as, server computer 604 may be arranged to employ one or more centralized security protocols to exchange secure communications over networks, including network path 614. Centralized security protocols may define handshake protocols, authentication protocols, key exchange protocols, or the like, or combination thereof, that implement the secure communication between the clients and servers. Accordingly, in at least one of the various embodiments, the centralized security protocols may include using one or more control keys, authentication keys, client keys, server keys, session keys, server session key, or the like, to encrypt or decrypt the communication traffic. Thus, in at least one of the various embodiments, if a secure/authenticated session is established between a client and a server, an NMC, such as, NMC 606 may require a session key to decrypt portions of the encrypted network packets that may be communicated over the secure communication channel. For example, if a client application running on client computer 602 establishes a secure session with a server application running on server computer 604, NMC 606 may require key information, such as, authentication keys, client keys, server keys, session keys, or the like, to decrypt the secure network traffic to perform monitoring and analysis of the contents of the packets in comprising the secure network traffic.

In some cases, NMC 606 may be able to derive and/or generate a session key by passively monitoring some or all of the handshake information that may be exchanged between the authentication control server 614, client 602, and application server computer 604. In some embodiments, NMCs may be configured to integrate or otherwise share information with authentication control servers that may be enabled to decrypt some or all of the handshake information exchanged between authentication control servers, clients, or servers. Accordingly, in some embodiments, NMCs may be arranged to monitor the one or more portions of the handshake process used to establish a secure session as well as both directions of the secure communications between clients or servers.

However, in some cases, NMCs may be disabled monitoring one or more portions of the handshake protocol. For example, in some embodiments, some organizations may restrict NMCs from having direct access to one or more sensitive cryptographic keys, such as, control keys, authentication keys, client keys, server keys, session keys, or the like. Likewise, in some embodiments, NMCs may be restricted to accessing portions of the exchanges between clients or servers. Accordingly, in one or more of the various embodiments, NMCs may be limited to capturing some portions of the handshake information or some portions of the exchanged secure communications. Note, in most circumstances, restricting NMC access to keys, handshake information, or the like, may disable the NMCs from decrypting some or all of the monitored traffic. However, in some embodiments, the NMCs may remain enabled to monitor one or more observable traffic features such as packet sizes, packet sources, packet targets, send/receive rates, request/response dwell times, or the like. Further, in some embodiments, if the secure traffic may be wrapped or included by another protocol, NMCs may be arranged to monitor unencrypted portions of the wrapping protocols. Likewise, in some embodiments, if the traffic secured by the centralized security protocol may be wrapped (transported) using another secure protocol, the NMCs may be arranged to decrypt the secure transport protocol to determine the portions of the traffic that that may be encrypted using the centralized security protocol.

In some embodiments, if NMC 606 is unable to obtain or derive key information using passive monitoring, one or more of client computer 602, server computer 604, or hardware security module 608, may be arranged to provide or communicate key information associated with a secure session to NMC 606. In such cases, if a secure session may be established, an authentication control server may provide key information to an NMC, such as NMC 606.

In at least one of the various embodiments, NMC 606 may be arranged to request the key information from authentication control servers, clients, servers, or the like, if it has observed and determined that the cryptographic handshake between the client and server has finished. In at least one of the various embodiments, authentication control servers may be arranged to communicate (e.g., push) key information to NMCs after secure communication sessions have been established.

In at least one of the various embodiments, there may be a time gap between when a client and server establish a secure communication session and when the NMC is provided a session key. Accordingly, in at least one of the various embodiments, NMCs may be arranged to buffer some or all of the secure communication traffic until a session key for the secure communication channel may be determined. If a session key is provided to the NMC or determined by the NMC, the NMC may first decrypt the buffered encrypted data and then decrypt the secure communication on the fly as it is received by the NMC.

Note, in some embodiments, NMCs configured to passively monitor network traffic may enable the network traffic between clients or servers to pass through while it collects enough network traffic or key information to decrypt the monitored network traffic.

In at least one of the various embodiments, if the secure communication traffic may be decrypted by an NMC, such as, NMC 606, it may perform one or more monitoring or analysis actions based on the decrypted contents of the secure communication. For example, in some embodiments, such actions may include modifying the content, tagging the traffic, applying a QoS policy, content switching, load-balancing, or the like, depending one or more rule-based policies.

In one or more of the various embodiments, an NMC, such as NMC 606 may be arranged to capture packets for storing in a packet capture data store, such as packet capture data store 610. In some embodiments encrypted packets may be captured and stored. Likewise, in some embodiments, un-encrypted packets may be captured by NMC 606 and stored in packet capture data store 610.

In one or more of the various embodiments, key escrow 612 may be a data store arranged to store cryptographic keys, cryptographic key information, or the like. In one or more of the various embodiments, secret sharing engines, such as secret sharing engine 222 or secret sharing engine 327 may be arranged to intercept and share the cryptographic keys, the key information, handshake information, or the like. In some embodiments, secret sharing engines may be arranged to store the cryptographic information in key escrow 612. In one or more of the various embodiments, the cryptographic information stored in key escrow 612 may be used to decrypt captured encrypted packets at a later time.

In one or more of the various embodiments, secret sharing engines may be arranged to communicate with NMCs to enable correlation information to be associated with the cryptographic key information. For example, NMC 606 may be arranged to obtain key information from the secret sharing engine. Accordingly, NMC 608 may determine the correlation information that correlates the communication session with the key information. Thus, in this example, NMC 606 may store the key information with the relevant correlation information in the key escrow 612.

In one or more of the various embodiments, a secret sharing engine may be arranged to determine the correlation information on its own. Accordingly, in some embodiments, the secret sharing engine may store the correlation information and the key information in a key escrow such as key escrow 612.

In one or more of the various embodiments, NMCs, such as NMC 606 may be arranged to decrypt monitored packets before they are stored in packet capture data store 610. In other embodiments, the NMC may be arranged to store or escrow the session key or other keying information to enable later decryption of captured packets rather than storing decrypted packets in packet capture data store 610. Also, in other embodiments, NMCs, such as NMC 606 may be arranged to decrypt some or all of the packets in real-time to enable network management policies to be applied based on the content of the packets. Accordingly, in some embodiments, after monitoring tasks are completed, the decrypted version of the packets may be discarded and the encrypted versions may be stored in the packet capture data store.

In one or more of the various embodiments, some or all of the key information may be provided to NMC 606 inline or otherwise included in network traffic communicated over network path 614. In some embodiments, the secret sharing engines residing on the computers participating in the secure communication session (e.g., client computer 602, application server computer 604, or the like) may be arranged to share secrets inline by including key information that includes some or all of the key information in one or more fields or one or more packets of the secure communication session established between client computer 602 or server computer 604. In some embodiments, the key information shared inline may be included in the network flow(s) (e.g., network path 614) comprising the secure communication session that is monitored by NMC 606. Accordingly, in some embodiments, the key information may be provided to NMC 606 during the secure handshake or other phases of the secure communication session.

In one or more of the various embodiments, NMC 606 may be arranged to detect and identify key information and extract the actual key information included in the network packets exchanged between clients and servers. In some embodiments, key information not normally exchanged between clients and servers may be included in the network packets by a secret sharing engine running on the clients or servers. In one or more of the various embodiments, the key information may be encrypted using a cryptographic key that is known to the secret sharing engines and NMC 606 and unknown to other applications involved in the secure communication session. In some embodiment, secret sharing engines and NMCs may be arranged to employ public key encryption to encrypt the key information.

For example, in some embodiments, a secret sharing engine on client computer 602 may encrypt and add the key information to the secure session traffic. Thus, in some embodiments, if NMC 606 receives the key information it may decrypt it for use as described herein. Also, in some embodiments, NMC 606 may be arranged to modify the network traffic to strip the key information from the secure session traffic rather than forwarding it to application server computer 604 or client computer 602 depending on the direction of the communication flow.

Accordingly, in one or more of the various embodiments, one or more NMCs may be arranged to internally modify the one or more network packets by removing the key information from the one or more network packets that are associated with the secure communication session. Then the one or more NMCs may be arranged to forward the modified one or more network packets to their next destination, such that modified network packets to appear as if they are non-modified.

For example, in one or more of the various embodiments, secret sharing engine may be arranged to compute one or more CRCs, hash values, sequence numbers, packet/message sizes, or the like, for the handshake traffic or other secure traffic before the encrypted key information is added to the secure session traffic or handshake traffic. Accordingly, one or more of the precomputed CRCs, hash values, sequence numbers, packet/message sizes, or the like, may be provided to the NMC along with the key information. Then, in one or more of the various embodiments, one or more of the precomputed CRCs, hash values, sequence numbers, packet/message sizes, or the like, may be used to restore the network traffic after the key information is removed from the network traffic.

Figure 7:
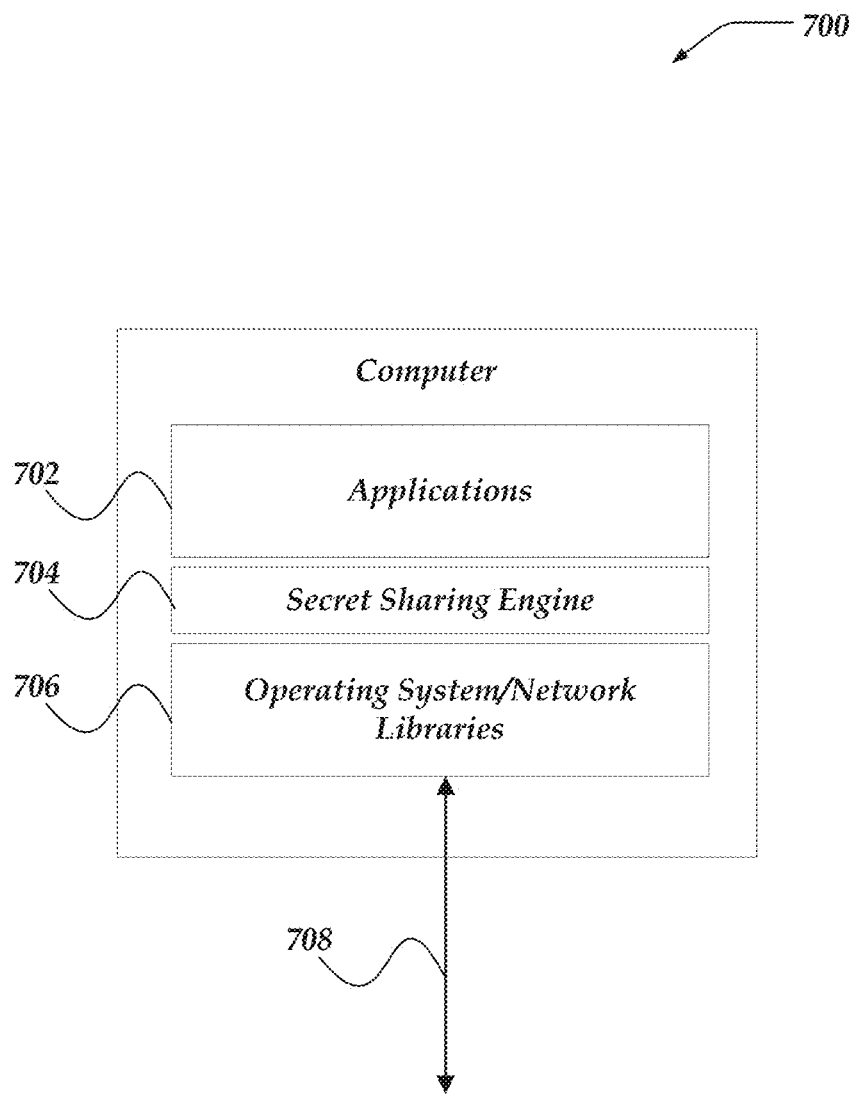
FIG. 7 illustrates a logical architecture of a computer for monitoring encrypted network traffic in accordance with at least one of the various embodiments.

FIG. 7 illustrates a logical architecture of computer 700 for monitoring encrypted network traffic in accordance with at least one of the various embodiments. In one or more of the various embodiments, as described above, a secret sharing engine may be installed on computers to enable cryptographic key information to be shared in line with an NMC. In one or more of the various embodiments, computers, such as computer 700 may be arranged include applications 702, secret sharing engine 704, operation system 706, or the like. In one or more of the various embodiments, operating system 706 may include one or more system libraries that enable communication over network path 708 to other computers or networks.

In one or more of the various embodiments, secret sharing engine 704 may be disposed logically between applications 702 and operating system 706. Accordingly, secret sharing engine 704 may be arranged to passively observe secure requests or secure responses to discover cryptographic secrets, including authentication keys, client keys, server keys, or session keys that may be employed by computer 700 to communicate with other computers.

Secret sharing engine 704 may be a process or service that is arranged to communicate one or more cryptographic secrets, key information, or the like, to one or more NMCs, such as, NMC 116 over network path 708. In some embodiments, the key information may be shared inline during or as part of a secure connection established between a client and a server. Further, in at least one of the various embodiments, secret sharing engine 704 may be arranged to be a plug-in of a web browser or other application. Also, in at least one of the various embodiments, secret sharing engine 704 may be embedded into cryptographic provider and/or a plug-in associated with a cryptographic provider, such as cryptographic provider 326.

In one or more of the various embodiments, secret sharing engines, such as secret sharing engine 704, secret sharing engine 224, secret sharing engine 327, or the like, may be arranged to provide system library interfaces that mimic standard interfaces to enable client applications that expect standard or common interfaces to operate without modification.

In one or more of the various embodiments, a secret sharing engine may be arranged to integrate with network service pipelines that may be supported by the host operating system or system libraries. For example, some operating systems may be arranged to enable authorized programs, drivers, or modules (e.g., kernel level services, Windows WDM drivers, Windows Kernel Mode Drivers, or the like) to be inserted into a network service pipeline.

In one or more of the various embodiments, a secret sharing engine may be arranged to enable client applications to explicitly make calls to the secret sharing engine. Accordingly, in one or more of the various embodiments, the client application may expressly control or direct the sharing of cryptographic secrets.

In one or more of the various embodiments, NMCs or secret sharing engines may be arranged to integrate directly with authentication control servers. In some embodiments, authentication control servers may be configured to share secrets or other keying information with NMCs directly via APIs or interfaces provided by the NMCs. Similarly, in some embodiments, NMCs or secret sharing engines may be arranged to communicate with authentication control servers via APIs or interfaces provided by the authentication control servers.

In one or more of the various embodiments, secret sharing engines may be arranged to employ protocol information to determine how to extract or collect secrets or keying information. For example, in some embodiments, protocol information, such as, protocol information 316, or the like, may include rules, patterns, state machines, or the like, for identifying protocols or tracking the state/steps of a secure session. Thus, in some embodiments, protocol information may be employed to determine if handshakes have been completed, or the like.

Figure 8:
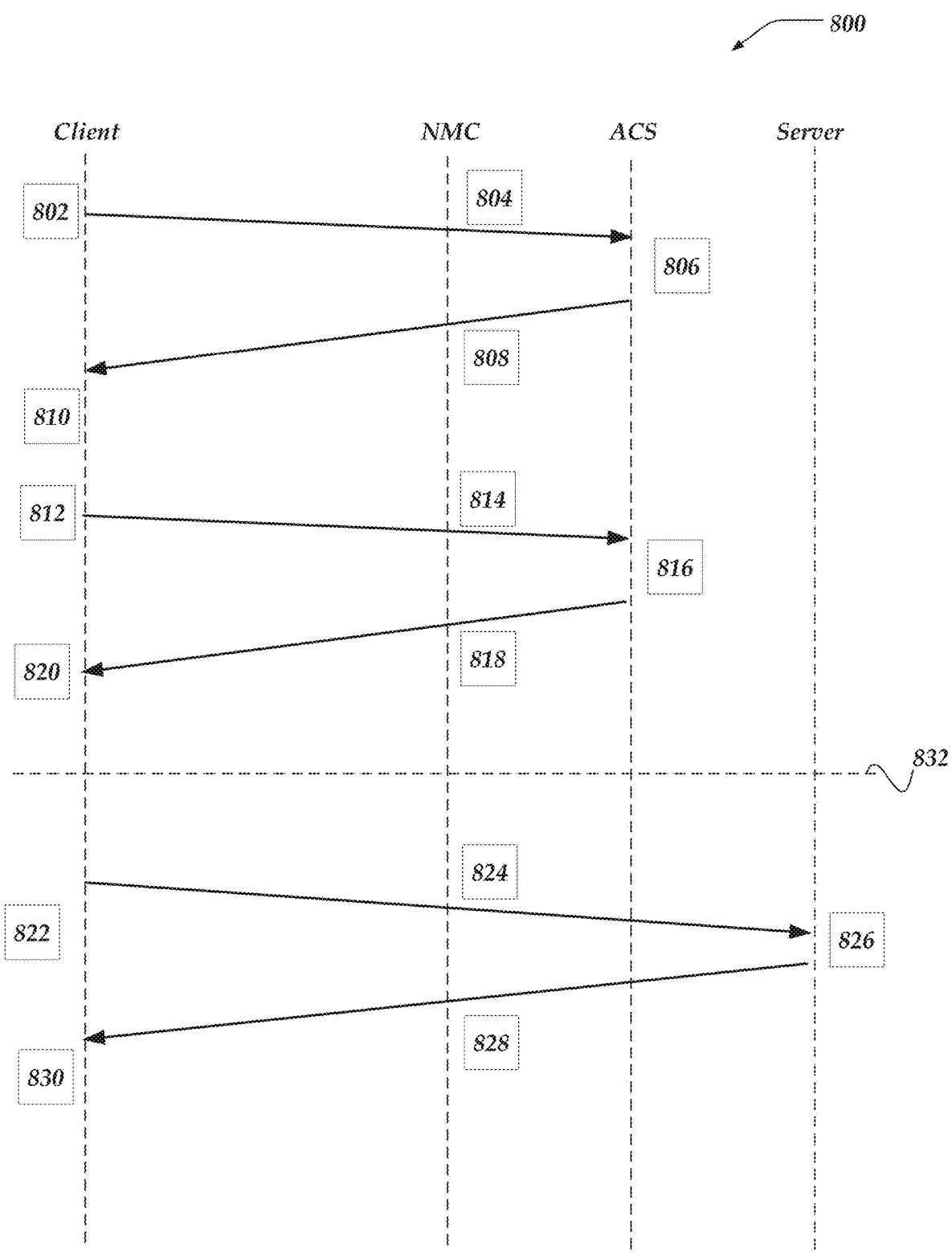
FIG. 8 illustrates a logical sequence diagram representation of a sequence for monitoring encrypted network traffic in accordance with one or more of the various embodiments.

FIG. 8 illustrates a logical sequence diagram representation of sequence 800 for monitoring encrypted network traffic in accordance with one or more of the various embodiments. In one or more of the various embodiments, sequence 800 illustrates network traffic exchanged by a client and a server with an NMC (e.g., NMC 408, NMC 502, NMC 606, or the like) arranged to monitor both directions of the network traffic.

At step 802, in one or more of the various embodiments, a client may intend to establish a secure connection with one or more resources in a monitored network. In some embodiments, the resources may be hosted or provided by one or more services or servers, for brevity and clarity, clients may be described as trying to establish a connection/session with a server even though a server may host or provide more than one services or resources that may be secured independently.

In one or more of the various embodiments, the services, applications, operating systems, or the like, on clients or servers may be configured to employ one or more centralized security protocols. In some embodiments, clients configured to employ centralized security protocols may be provided client keys for the centralized security protocol in advance of using the centralized security protocol. Accordingly, in some embodiments, authentication control servers may be arranged to distribute client keys to clients enabled to access servers protected by the centralized security protocol. In some embodiments, various conventional or customized secure key distribution facilities may be employed to distribute unique client keys to clients. Similarly, in some embodiments, authentication control servers may provide server keys to servers in the protected network.

In one or more of the various embodiments, the client may be arranged to generate an authentication request that includes initialization information required by the centralized security protocol. In some embodiments, this may include identity information (e.g., username, service name, or the like), time/date of message, or the like. In some embodiments, the specific information may vary depending on the particular centralized security protocol or organization policies.

Further, in one or more of the various embodiments, clients may be arranged to encrypt one or more secrets using their client key. In some embodiments, the secret may be a timestamp corresponding to the time step 802 may be performed by the client.

Accordingly, in some embodiments, the client may generate an authentication request that includes the initialization information and the encrypted secret. In some embodiments, the client may be arranged to send the authentication request to an authentication control server that may be protecting the servers the client may be attempting to access.

At step 804, in one or more of the various embodiments, an NMC may be arranged to passively intercept the authentication request sent by the client.

In one or more of the various embodiments, if the NMC has access the client key it may decrypt the portion of the request that has been encrypted using the client key.

In one or more of the various embodiments, the NMC may be arranged to evaluate one or more characteristics of the request to determine if it conforms to the centralized security protocol or one or more security policies associated with the centralized security protocol or the client.

For example, in some embodiments, if the NMC has the client key, it may maintain an index that maps client identifiers (e.g., IP addresses, MAC addresses, user information, or the like) to client keys. In this example, the NMC may be configured to determine if the characteristics of the client sending the authentication request is the client associated with the client key.

Similarly, for example, in some embodiments, NMCs may be arranged to evaluate one or more open (non-secured) characteristics of the authentication request to determine other anomalies, such as, unexpected time of the request, packet size inconsistencies, timing inconsistencies, or the like. Thus, in some embodiments, NMCs may be arranged to evaluate authentication request even if the NMCs are disabled from accessing client keys.

In some embodiments, the NMC may be arranged to decrypt or decode one or more portions the authentication request depending on the access level or authorization level that has been granted to the NMC. Also, in one or more of the various embodiments, one or more agents operative (e.g., secret sharing engines) on the client computer or elsewhere may be arranged to communicate some or all of the information included in the authentication request directly to the NMC.

Accordingly, in some embodiments, the NMC may be arranged to store one or more values or metrics associated with the client to enable it map or otherwise correlate subsequent encrypted or unencrypted network traffic with the client.

At step 806, in one or more of the various embodiments, the authentication request may be provided to the authentication control server.

In one or more of the various embodiments, the authentication control server may be arranged to decrypt the secrets provided by the client using the client key that the authentication control server has stored. In some embodiments, if the secret encrypted by the client is a timestamp, the authentication control server may be arranged to compare the decrypted timestamp value to the current time to evaluate if the authentication request is valid.

In one or more of the various embodiments, if the authentication request may be validated, the authentication control server may be arranged to generate an authentication response. In some embodiments, the authentication response may include two or more portions. In one or more of the various embodiments, one client portion may include information that enables clients to determine if they are communicating with the proper authentication control server. For example, in some embodiments, a portion of the authentication response may include identity/name of the authentication control server, a timestamp corresponding when the authentication control server generated the authentication response, an expiration date and a session key.

Also, in one or more of the various embodiments, the authentication control server may be arranged to generate an authentication portion of the authentication response that may be considered an authentication key that includes values such as, client/user ID, authentication control server name/ID, a timestamp, network address of the client, an expiration date, the session key, or the like. Note, the session key included in the client portion and the session key included in the authentication portion may be considered to be the same key or otherwise have the same value.

In one or more of the various embodiments, authentication control server may be arranged to encrypt the client portion of the response authentication response using the client key that it has stored. Similarly, in some embodiments, the authentication control server may be arranged to encrypt the authentication portion of the authentication response using its own control key.

In one or more of the various embodiments, the authentication control server may be arranged to send the authentication response to the client.

At step 808, in one or more of the various embodiments, the NMC may be arranged to observe the authentication response. In some embodiments, the NMC may be arranged to decrypt or decode one or more portions the authentication response depending on the access level or authorization level that has been granted to the NMC. Also, in one or more of the various embodiments, one or more agents operative on the authentication control server or elsewhere may be arranged to communicate some or all of the information included in the authentication response directly to the NMC.

Accordingly, in some embodiments, the NMC may be arranged to store one or more values or metrics associated with the session that enable it map or otherwise correlate subsequent encrypted or unencrypted network traffic with the client or the server.

At step 810, in one or more of the various embodiments, the client may receive the authentication response from the authentication control server.

In one or more of the various embodiments, the client may be arranged to decrypt the client portion of the authentication response because it was encrypted using the client key. Accordingly, in one or more of the various embodiments, the client may decrypt the authentication response to obtain to a session key. According to the centralized security protocol, the client may store the session key locally for future use.

In one or more of the various embodiments, the client may also keep a copy of the authentication portion of the response which serves as the authentication key. In some embodiments, the client may be disabled from decrypting the authentication key because it was encrypted by the authentication control server using a control key that is not available to the client.

In some embodiments, an agent (e.g., secret sharing engine) running on the client may be arranged to intercept or otherwise acquire one or more of the session key or the authentication key to provide to the NMC. In some embodiments, agents may be arranged to provide additional information, such as, one or more portions of the authentication response, one or more metrics, log information, one or more timestamps, or the like, to the NMC. Accordingly, in one or more of the various embodiments, the NMC may be arranged to associate the information provided by the agent with the client, server, or the session.

In some embodiments, the NMC may be arranged to evaluate one or more characteristics of the authentication response or its contents to determine if the session or its associated traffic conforms to one or more security policies.

In one or more of the various embodiments, clients may store the session key and the authentication key until they may be needed for accessing resources secured by the authentication control server.

At step 812, in some embodiments, the client may prepare an access request that asks the authentication control server to authenticate that the client has permission to access the server.

Similar to other messages generated by the authentication control server, the access request may include two or more portions.

In some embodiments, a server portion of the access request may include the name or identifier of the server the client wants to access, the authentication key, or the like. In some embodiments, additional information may include timestamps, expiration time of the authorization if granted, or the like.

In some embodiments, another portion of the access request may include an authenticator portion that includes a client/user ID, timestamp, or the like.

In one or more of the various embodiments, the client may encrypt the authenticator portion using the session key. In contrast, in some embodiments, the server portion may remain unencrypted. However, in some embodiments, the server portion may include the authentication key which remains encrypted.

Note, in some embodiments, the transport protocol used to communicate between the client and authentication control server may encrypt some or all of the access request. However, here it may be assumed that the encryption actions associated with securing the transport protocol (if any) may be unrelated to the centralized security protocol.

In one or more of the various embodiments, if the access request is generated, the client may send it to authentication control server.

Note, in some embodiments, an agent running on the client may be arranged to intercept or otherwise acquire one or more portions of the access request to provide to the NMC. In some embodiments, agents may be arranged to provide additional information, such as, one or more metrics, log information, one or more timestamps, or the like, to the NMC. Accordingly, in one or more of the various embodiments, the NMC may be arranged to associate the information provided by the agent with the client, server, or the session.

In some embodiments, the NMC may be arranged to evaluate one or more characteristics of the response message or its contents to determine if the session or its associated traffic conforms to one or more security policies.

At step 814, in one or more of the various embodiments, the NMC may be arranged to observe the some or all of network traffic that communicates the access request to the authentication control server.

In one or more of the various embodiments, if the NMC has access to the session key it may decrypt the server portion of the access request to monitor the exchange. Likewise, in some embodiments, if the NMC has access to the control key it may decrypt the authentication key to monitor the exchange.

In some embodiments, if the NMC does not have the control key which may be considered too sensitive to distribute, the NMC may compare the authentication key that was provided via previous messages with the authentication key included in the access request.

Also, in some embodiments, the NMC may be arranged to ensure the characteristics, fields, values, or the like, that are visible to it conform to one or more policies.

At step 816, in some embodiments, the authentication control server may receive the access request. In some embodiments, the authentication control server may be arranged to decrypt the authentication key provided in the access request to obtain the session key. Thus, in some embodiments, if the session key from the authentication key enables the authenticator sent by the client to be decoded, the authentication control server may be arranged to confirm that the session key included in the authentication key matches the session key included in the authenticator.

In this example, the authenticator includes a user ID and a timestamp. Thus, if the user ID stored in the authenticate key matches the user ID stored in the decrypted authenticator, the authentication control server may assume that it is a known client that has sent the access request. For example, in some embodiments, if a client uses a session key that is not included in the authentication key, the decryption of the authenticator will fail providing at least a user ID mismatch.

Accordingly, the authentication control server may perform various actions associated with enforcing the centralized security protocol, including determining if the client has access to the requested resource.

In one or more of the various embodiments, if the authentication control server determines that the client has access to the server, it may generate a server session key based on the server's secret key.

Accordingly, in one or more of the various embodiments, if the authentication control server determines that the client has access to the requested server, it may generate an access response that includes two or more portions, one or more portions may be encrypted with the session key and one or more other portions may be encrypted with the server key that corresponds to the server the client is requesting to access. Note, in this example, the authentication control server has access to secret keys for all of the entities (e.g., users, clients, servers, resources, services, or the like) it may be responsible for securing.

In some embodiments, a client portion of the access response may include various fields including, the name or ID of the server the client may be attempting to access, a timestamp, an expiration date/time, and the service session key. Further, in some embodiments, the authentication control server may encrypt the client portion of the access response using the session key.

Accordingly, in some embodiments, the authentication control server may send the access response to the client.

At step 818, in one or more of the various embodiments, the NMC may be arranged to observe the some or all of network traffic that communicates the access response to the client.

In one or more of the various embodiments, if the NMC has access to the session key it may decrypt the client portion of the access response to monitor the exchange. Likewise, in some embodiments, if the NMC has access to the server secret key it may decrypt the server portion of the access response to monitor the exchange.

Also, in some embodiments, the NMC may be arranged to ensure the characteristics, fields, values, or the like, that are visible to it conform to one or more policies.

At step 820, in one or more of the various embodiments, the client receives the access response from the authentication control server.

In one or more of the various embodiments, the client may decrypt the client portion of the access response using its copy of the session key that includes the server session key.

At step 822, in some embodiments, the client may generate server request intended for sending to the server. In some embodiments, the server request may include two or more portions, including a client authenticator portion and a server portion. In some embodiments, the authenticator portion may include the user/client name or ID, a timestamp, or the like. In some embodiments, additional fields may be included depending on the particular centralized security protocol. In some embodiments, the authenticator portion may be encrypted using the service session key provided by the authentication control server.

In one or more of the various embodiments, another portion of the server request may include the portion of the access response message the was encrypted with the server's secret key.

In some embodiments, the server request may be embedded or included in another protocol, such as, the application level protocol used to communicate with the request resources. In one or more of the various embodiments, the particular mechanism or facilities for used within the application protocols may vary depending on the particular protocol used for exchanging network traffic.

Accordingly, in some embodiments, the client may send the server request to the server.

At step 824, in one or more of the various embodiments, the NMC may be arranged to observe the some or all of network traffic that communicates the server request to the server.

In one or more of the various embodiments, if the NMC has access to the service session key it may decrypt the authenticator portion of the server request to monitor the exchange. Likewise, in some embodiments, if the NMC has access to the server secret key it may decrypt the server portion of the server request to monitor the exchange.

Also, in some embodiments, the NMC may be arranged to ensure the characteristics, fields, values, or the like, that are visible to it conform to one or more policies.

At step 826, in one or more of the various embodiments, the server may receive the server request.

Accordingly, in one or more of the various embodiments, the server may decrypt the server portion of the server request message to obtain the server session key. In some embodiments, the server may employ the server session key to decrypt the authenticator to validate the server request.

In some embodiments, if the server has validated the server request, it may determine if the client/user has access to resources it may be requesting. Note, in some embodiments, this may be the responsibility of the server operating system or other applications associated with the services or resources the client may be requesting to access. Accordingly, in some embodiments, the centralized security protocol may be relied on to reliably authenticate the identity of the client making the request. However, in some embodiments, it may be the responsibly of other services or applications to determine if the client may be authorized to access the requested resources or services.

In some embodiments, the server request (from the client) may be embedded or included in another protocol, such as, the application level protocol used to communicate with the request resources. In one or more of the various embodiments, the particular mechanism or facilities used within the application protocols may vary depending the particular protocol.

In some embodiments, if the client has been authenticated and determined to be authorized to access the requested service or resource, the server may generate a server response that includes a service authenticator that includes the service/resource name or ID, a timestamp, or one or more optional values.

In one or more of the various embodiments, the server response may be encrypted using the service session key and send to the client.

At step 828, in one or more of the various embodiments, the NMC may be arranged to observe the some or all of network traffic that communicates the server response to the client.

In one or more of the various embodiments, if the NMC has access to the service session key it may decrypt the authenticator portion of the server response to monitor the exchange.

Also, in some embodiments, the NMC may be arranged to ensure the characteristics, fields, values, or the like, that are visible to it conform to one or more policies.

At step 830, in one or more of the various embodiments, the client may decrypt the server authenticator portion of the server response using the service session key it previously obtained at step 820 enabling the client to validate that the server response was sent by the correct server.

Accordingly, in some embodiments, further communication between client and the server may proceed similarly by including centralized security protocol authenticator portion with each subsequent request/response.

Figure 9:
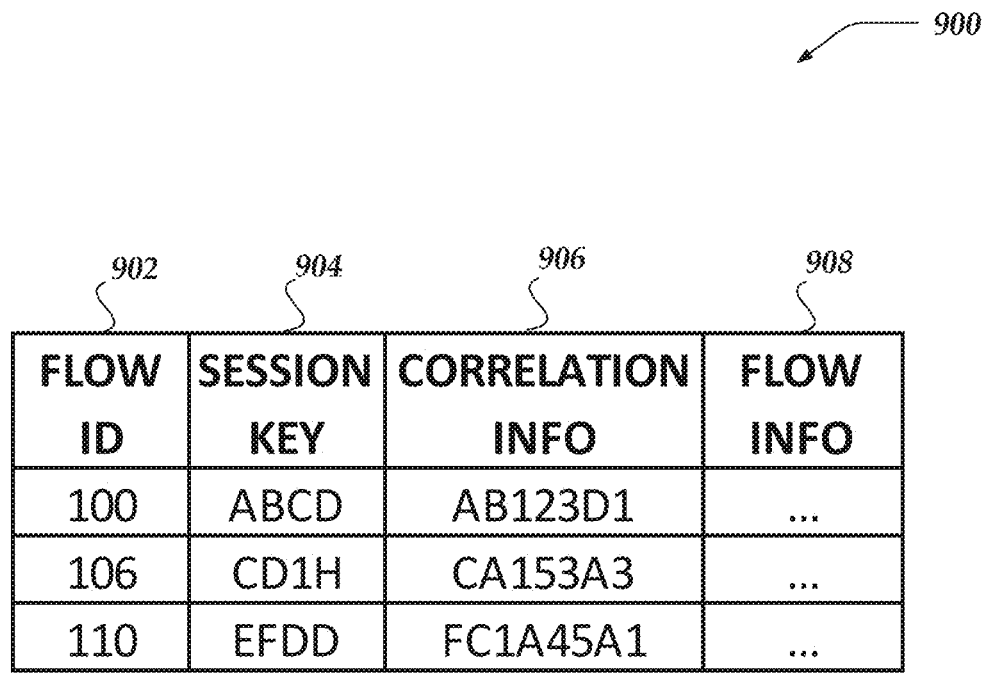
FIG. 9 illustrates a logical representation of a table that an NMC may employ to associate control keys, authentication keys, session keys, server keys, service session keys, or other key information with particular communication sessions, secure connections, or network flows in accordance with one or more of various embodiments.

FIG. 9 illustrates a logical representation of table 900 that a NMC may employ to associate control keys, authentication keys, session keys, server keys, service session keys, or other key information with particular communication sessions, secure connections, or network flows in accordance with one or more of various embodiments. In at least one of the various embodiments, table 900 may be implemented using one or more data structures, such as, lists, arrays, associative arrays, or the like, or combination thereof. Furthermore, one of ordinary skill in the art will appreciate that other data structures or table arrangements are within the scope of the innovations described herein. However, the description of table 900 is at least sufficient to enable one or ordinary skill in the art to practice the innovations described herein.

In at least one of the various embodiments, some or all of the information represented by table 900 may be stored in capture data store 312, key escrow 314, or the like, on a network computer, such as network computer 300. In some embodiments, table 900 may be stored in the working memory of a NMC and used during real-time monitoring of network packets.

In at least one of the various embodiments, column 902 of table 900 may contain a value that corresponds to a particular network connection, network flow, communication channel, or the like. The NMC may be arranged to index, key, or otherwise identify each network flow that it is monitoring. In at least one of the various embodiments, column 904 may include a session key or other key information that is associated with a secure network flow. The session key may correspond to a session established between clients, servers, authentication control servers, or the like, that may by occurring in a protected network.

In at least one of the various embodiments, column 906 may include one or more types of correlation information that may be associated with a network flow or session. The correlation information value may be used in part to determine which network flow a key corresponds to. In some embodiments, correlation information may include one or more of tuple information associated with a communication session, some or all of the handshake information, one or more other network characteristics associated with the communication session, or the like. In some embodiments, column 908 may contain one or more fields of additional data that may be associated with a network flow. Column 908 represents additional information or metrics that may be collected or associated with a given network flow.

In one or more of the various embodiments, a flow identifier (e.g., values in column 902) may be based on the flow tuple information associated with a secure network flow or secure network connection. In some embodiments, a flow identifier may be generated by using a hash of some or all of the tuple information for a flow. For example, Flow ID=HashFunction(Source IP, Destination IP, Source Port, Destination Port).

Generalized Operations

Figure 10:
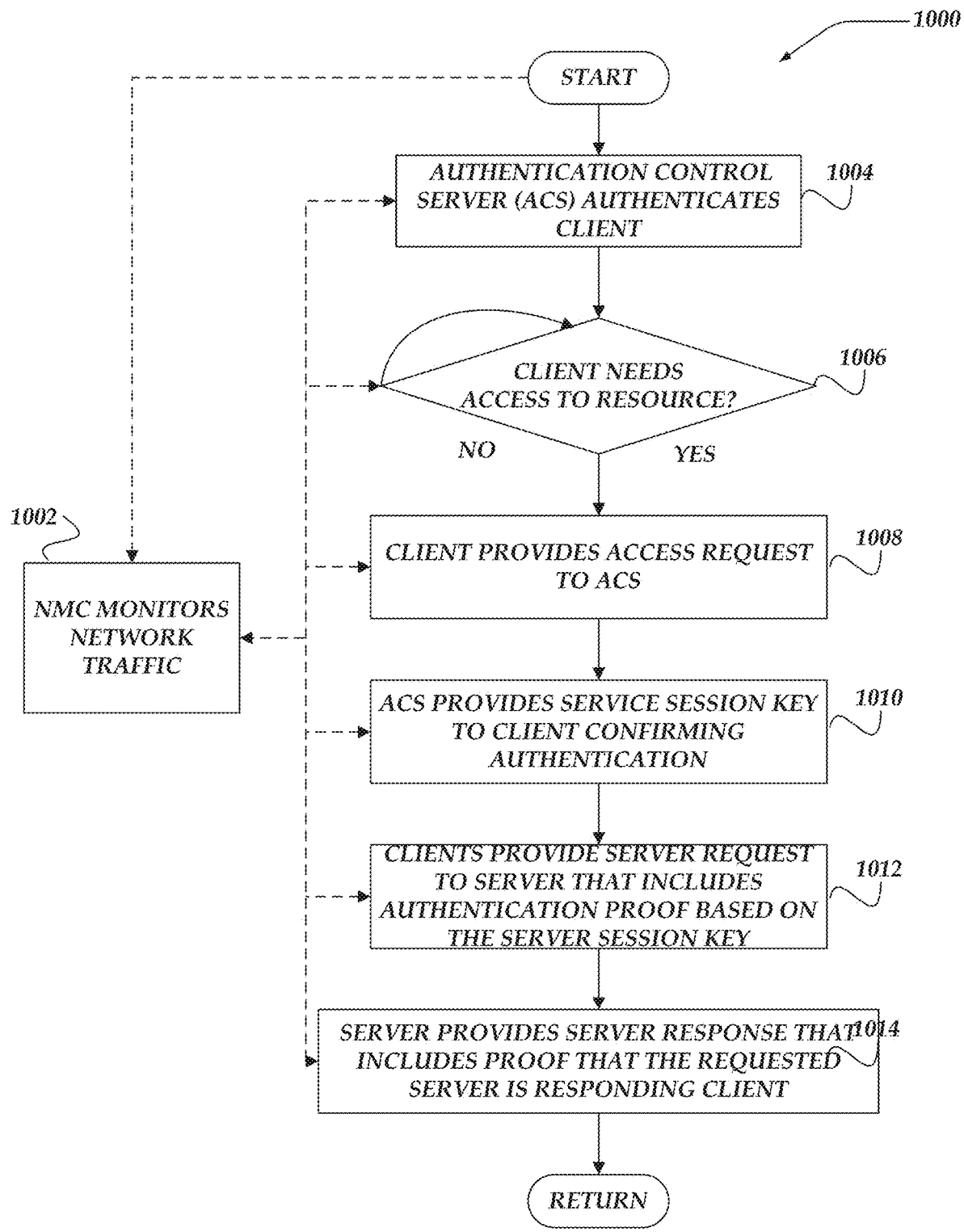
FIG. 10 illustrates an overview flowchart of a process for monitoring encrypted network traffic in accordance with at least one of the various embodiments.
Figure 11:
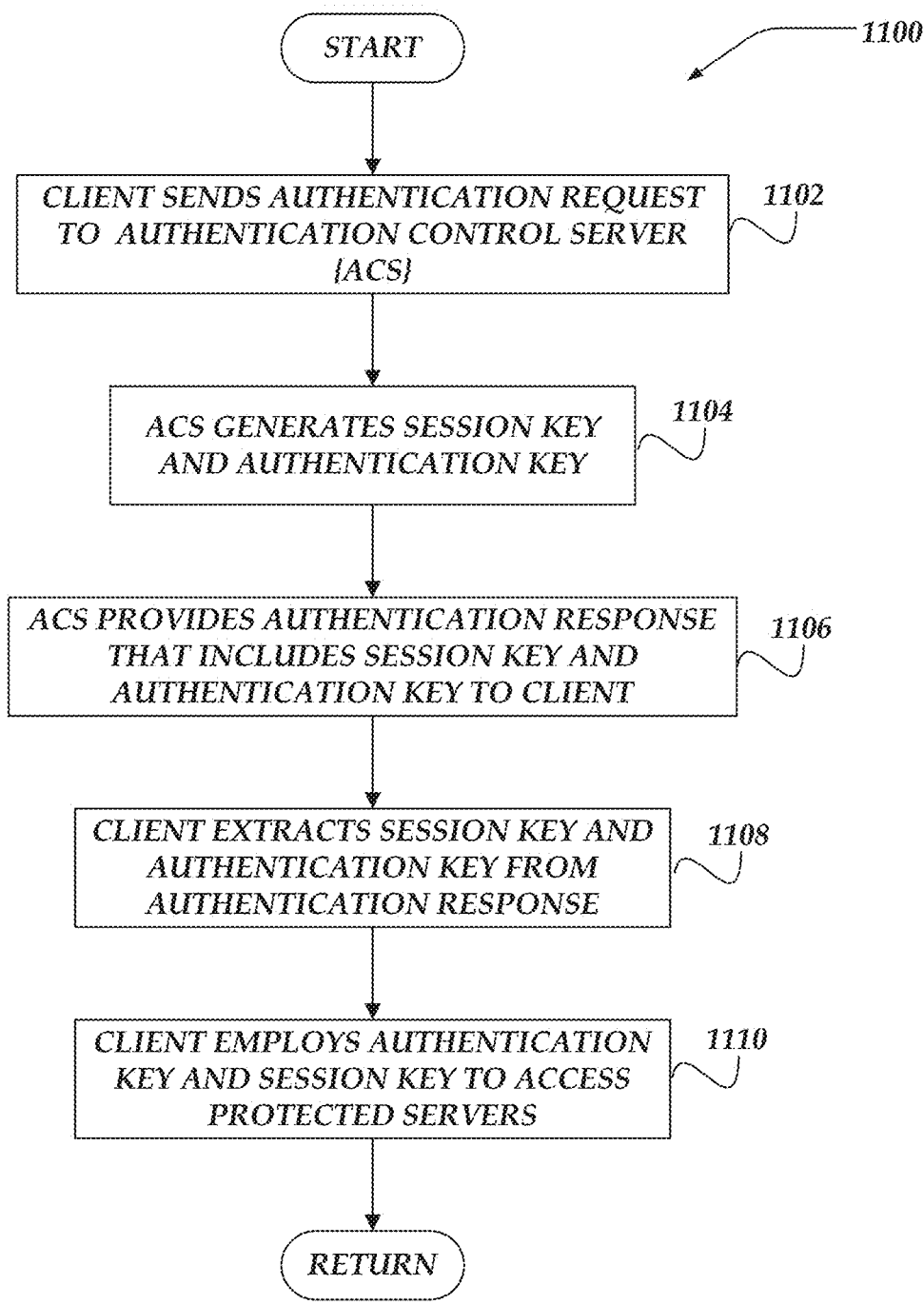
FIG. 11 illustrates a flowchart of a process for authenticating clients for monitoring encrypted network traffic in accordance with at least one of the various embodiments.
Figure 12:
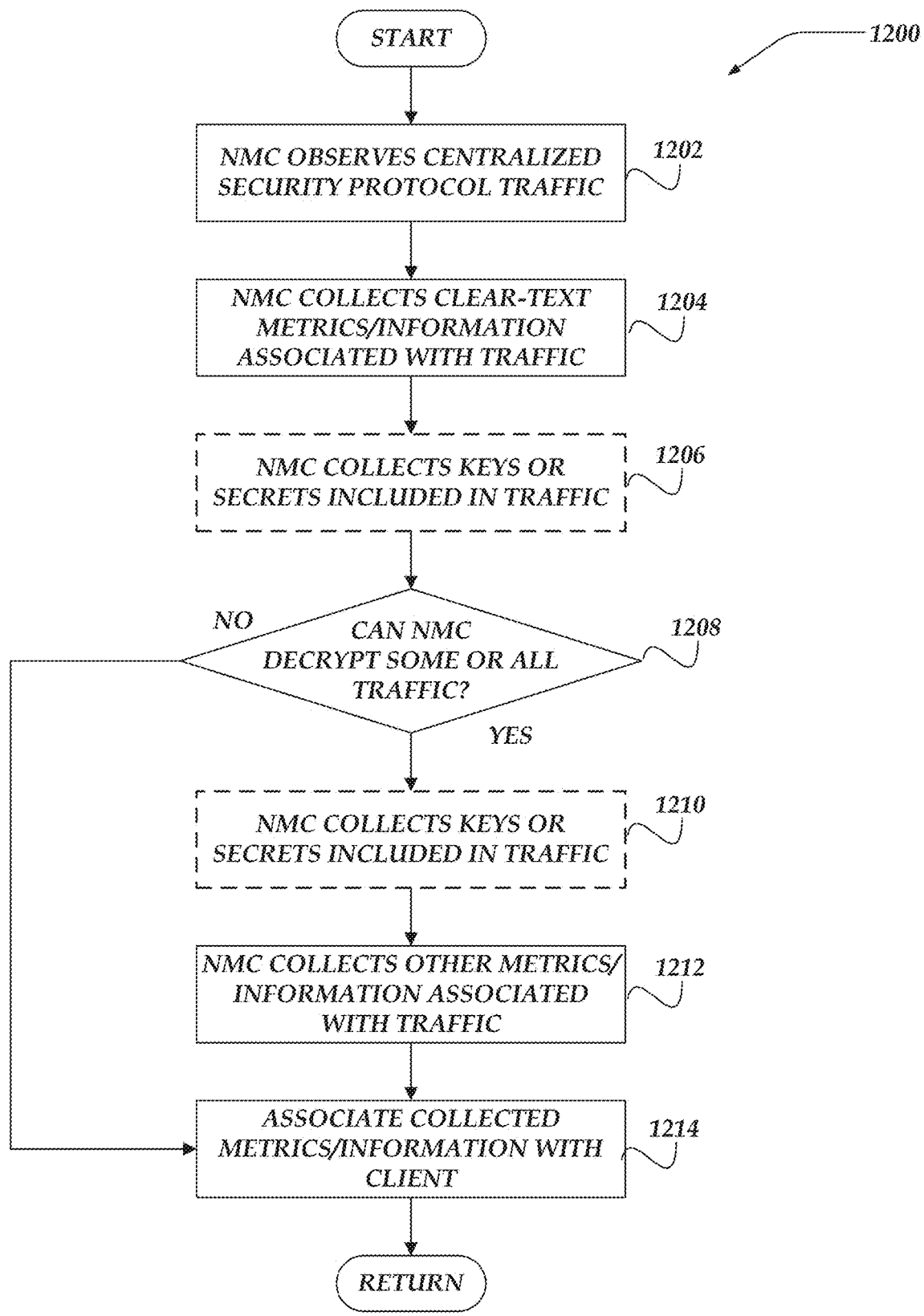
FIG. 12 illustrates a flowchart of a process for authenticating clients for monitoring encrypted network traffic in accordance with at least one of the various embodiments.

FIGS. 10-12 represent generalized operations for monitoring encrypted network traffic in accordance with one or more of the various embodiments. In one or more of the various embodiments, processes 1000, 1100, and 1200 described in conjunction with FIGS. 10-12 may be implemented by or executed by one or more processors on a single network computer (or network monitoring computer), such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based environment. Also, in some embodiments, these processes, or portions thereof, may be implemented by or executed on one or more virtualized containers, such as, those in a container-based computing environment. However, embodiments are not so limited and various combinations of network computers, client computers, or the like may be utilized. Further, in one or more of the various embodiments, the processes described in conjunction with FIGS. 10-12 may be used for monitoring encrypted network traffic in accordance with at least one of the various embodiments or architectures such as those described in conjunction with FIGS. 4-9. Further, in one or more of the various embodiments, some or all of the actions performed by processes 1000, 1100, and 1200 may be executed in part by network monitoring engine 322, packet capture engine 324, crypto provider engine 326, secret sharing engine 327, or the like, running on one or more processors of one or more network computers.

FIG. 10 illustrates an overview flowchart of process 1000 for monitoring encrypted network traffic in accordance with at least one of the various embodiments. After a start block, at block 1002, in one or more of the various embodiments, a network monitoring computer (NMC) may be arranged to monitor network traffic on one or more networks as described above. As described above, NMCs may be configured to monitor some or all of the traffic in one or more monitored networks. Accordingly, in some embodiments, NMCs may be arranged to monitor network traffic associated with centralized security protocols that may occur in the monitored networks.

In this example, for brevity and clarity, block 1002 is illustrated with dashed lines connecting it to the other blocks in the flowchart. This represents that the NMC can monitor the network traffic associated with the other blocks. Accordingly, in some embodiments, NMCs may perform one or more actions related to monitoring encrypted network traffic before or after each block.

At block 1004, in one or more of the various embodiments, an authentication control server may authenticate a client. As described above, clients may employ centralized security protocol to authenticate themselves with the authentication control server that may be protecting the network.

In one or more of the various embodiments, if the client is authenticated, the authentication control server may provide it an authentication key and session key that may be used for subsequent centralized security protocol exchanges.

At decision block 1006, in one or more of the various embodiments, if the authenticated client needs to access a protected server, control may flow to block 1008; otherwise, control may loop back to decision block 1006.

At block 1008, in one or more of the various embodiments, the client may provide an access request message to the authentication control server. In one or more of the various embodiments, clients may request to access a particular server that may be protected by the authentication control server. Accordingly, in some embodiments, the client may employ authentication keys and session key to construct an access request that conforms to the centralized security protocol.

At block 1010, in one or more of the various embodiments, the authentication control server may provide an access response that includes authentication information that enables the client the validate itself with the server. In some embodiments, the authentication information may include, among other things, a service session key that enables the client to validate itself with the server the client may be requesting to access.

At block 1012, in one or more of the various embodiments, the client may provide a server request to the server corresponding to the authentication information. In one or more of the various embodiments, the server request may include, among other things, the service session key.

At block 1014, in one or more of the various embodiments, the server may provide a server response that include authentication information to the client. In one or more of the various embodiments, the client may validate that the server response is provided by the server it sent to the server request using the service session key.

Next, in one or more of the various embodiments, control may be returned to a calling process.

FIG. 11 illustrates a flowchart of process 1100 for authenticating clients for monitoring encrypted network traffic in accordance with at least one of the various embodiments. After a start block, at block 1102, in one or more of the various embodiments, a client may send an authentication request to an authentication control server.

Note, similar to process 1000 described above, an NMC may be arranged to monitor the network traffic exchanged between clients or servers. Also, in some embodiments, NMCs may be provided other information from agents residing on clients or servers or via one or more integration APIs. However, for brevity and clarity this flowchart omits blocks showing the actions of the NMCs. Accordingly, in some embodiments, NMC actions may be described in or along with the blocks associated with the relevant NMC actions.

As described above, clients may submit authentication requests to authentication control servers at various times before they request to access servers that may be protected by a centralized security protocol. For example, in some embodiments, a client may submit authentication requests if a user logs in at the beginning of the workday.

In one or more of the various embodiments, the authentication request may include information the client has encrypted with its client key.

Accordingly, in one or more of the various embodiments, depending on the configuration of the NMC and its access to the client key, the NMC may be arranged to decrypt the portion(s) of the authentication request that has been encrypted.

Alternatively, in some embodiments, an agent residing on the client may communicate one or more values included in the authentication request directly to the NMC. In some cases, this information may include one or more of the client keys, client names/IDs, user names/IDs, the client application name, or the like.

As described above, the authentication request may include various values depending on the particular centralized security protocol being used as well as configuration information that may define one or more optional/extra fields associated with a local deployment of the centralized security protocol.

For example, for some embodiments, if the centralized security protocol may be Kerberos or a Kerberos-like centralized security protocol, the authentication request may include information, such as, user/client name/ID, service name/ID, client IP address, expiration time request, or the like. However, one of ordinary skill in the art will appreciate that additional values may be included depending the on how the centralized security protocol is configured.

At block 1104, in one or more of the various embodiments, the authentication control server may generate a session key and an authentication key. As described above, the authentication control server may employ its copy of the client key to validate the authentication request based on decrypting the portion of the request that the client encrypted with the client key.

As described above, the authentication key may include various values depending on the particular centralized security protocol being used as well as configuration information that may define one or more optional/extra fields that a local deployment of the centralized security protocol may be employing. In some embodiments, the authentication information may be encrypted using the authentication control server's control key. Accordingly, the information that comprises the authentication key may be hidden.

For example, for some embodiments, if the centralized security protocol may be Kerberos or a Kerberos-like centralized security protocol, the authentication key may include information, such as, user name/ID, authentication control server name/ID, a timestamp, an expiration time for the authentication key, the session key, or the like. Accordingly, in this example, this information may be encrypted using the authentication control server's control key.

At block 1106, in one or more of the various embodiments, the authentication control server may provide an authentication response that includes a session key and authentication key to the client.

In one or more of the various embodiments, the authentication response may include a client portion as well as the authentication key. In some embodiments, the client may include one or more fields, including the session key, authentication control server name/ID, a timestamp, expiration time information, or the like. In one or more of the various embodiments, the authentication control server may encrypt the client portion of the response using the client key.

Accordingly, in some embodiments, the NMC may monitor the network traffic associated with the authentication response. In one or more of the various embodiments, if the NMC has the client key it may decrypt the client portion of the authentication response.

At block 1108, in one or more of the various embodiments, the client may extract the session key and authentication key from the authentication response provided by the authentication control server. As described above, the authentication key may be cryptographically opaque to the client because it may be a data structure that has been encrypted by the authentication control server using its control key. Accordingly, in some embodiments, the client may store the authentication key for future use.

Also, in one or more of the various embodiments, the session key may be extracted by decrypting a client portion of the message that includes the session key using the client key. Accordingly, the client may store the session key for future use.

In some embodiments, an agent running on the client may be arranged to provide one or more portions of the authentication response, such as, the session key, the authentication key, timestamps, expiration data, authentication control server name/ID, or the like, to the NMC.

At block 1110, in one or more of the various embodiments, the client may employ the authentication key and the session key to access protected servers. As described herein, the clients may provide access requests for accessing particular protected servers.

Next, in one or more of the various embodiments, control may be returned to a calling process.

FIG. 12 illustrates a flowchart of process 1200 for authenticating clients for monitoring encrypted network traffic in accordance with at least one of the various embodiments. After a start block, at block 1202, in one or more of the various embodiments, an NMC may be arranged to monitor network traffic that may be associated with one or more centralized security protocols.

At block 1204, in one or more of the various embodiments, the NMC may be arranged to collect clear-text metrics/information associated the monitored network traffic. In some embodiments, in most circumstances, NMCs may be arranged to collect various metrics associated with centralized security protocol network traffic. In one or more of the various embodiments, one or more metrics may be based on monitoring centralized security protocol network traffic even if the NMC has no access to authentication keys, client keys, session keys, services, or the like. Similarly, in some embodiments, NMCs may be arranged to collect some metrics in the absence of agents or integration with an authentication control server keys.

Accordingly, in some embodiments, NMCs may be arranged to generate metrics based on one or more the centralized security protocol network traffic that may be unencrypted (e.g., "in the clear"). In some embodiments, the one or more portions may include tuple information, one or more fields associated with transport protocols used to carry the centralized security protocol network traffic, one or more fields associated with applications/application protocols that may employ the centralized security protocol for authentication, source of the network traffic, destination of the network traffic, timing/latency information, packet size information, packet send rate, routing/proxying/pathing information associated with the centralized security protocol network traffic, or the like.

In one or more of the various embodiments, NMCs may be arranged to associate the one or more metrics with the network traffic flows associated with the centralized security protocol network traffic. Accordingly, in some embodiments, the metrics may be employed to evaluate if the centralized security protocol network traffic conforms to network security policies enforced or monitored by the NMC.

Note, in some embodiments, transport protocols, application protocols, or the like, may employ their own encryption that is not being considered here. In this context unencrypted network traffic is network traffic that is not encrypted using the centralized security protocol. One of ordinary skill in the art will appreciate that there may be other/additional encryption protocols that may be involved at different levels of the communications or for different purposes. Accordingly, it may be assumed that the NMCs may be configured to those handle other encryption protocols separate from the innovations described herein for centralized security protocols.

At block 1206, in one or more of the various embodiments, optionally, the NMC may be arranged to collect one or more keys or secrets included the monitored network traffic.

In one or more of the various embodiments, as described above, various network exchanges between client, servers, or authentication control servers may include keys or key material associated with one or more of authentication keys, client keys, session keys, service keys, or the like.

In one or more of the various embodiments, NMCs may be arranged to integrate with one or more agents that may be deployed on one or more clients or servers. As described above, in some embodiments, agents may be integrated with local applications or local system libraries that enable them to capture various information associated with centralized security protocols. In some embodiments, this may include one or more keys or key material.

Likewise, in some embodiments, NMCs may be configured by distributing one or more keys or key material before monitoring centralized security protocol network traffic. In some embodiments, this may be accomplished automatically if an NMC is configured to integrate with authentication control servers. Also, in some embodiments, NMCs may be configured with keys or key material manually by users or other services. In one or more of the various embodiments, NMCs may be arranged to be associated the keys or key material with clients, servers, applications, authentication control servers, or the like.

For example, in some embodiments, NMCs may be arranged to associate identifying information of clients, servers, users, or the like, with the provided keys or key material. In some embodiments, this information may include, network addresses, names/labels, or the like.

Note, this block may be considered optional because in some cases or in some embodiments the NMC may be disabled from collecting one or more keys or one or more secrets because of the absence necessary information or for policy reasons. Likewise, in some cases, the NMC may have already collected some or all of keys or secrets.

At decision block 1208, in one or more of the various embodiments, if the NMC can decrypt some or all of the traffic associated with the centralized security protocol, control may flow to block 1210; otherwise, control may flow to block 1214. In one or more of the various embodiments, NMCs may be arranged to decrypt different portions of the centralized security protocol network traffic depending on the keys that may be available.

Accordingly, in some embodiments, NMCs may be disabled from decrypting some or all portions of the centralized security protocol depending on the keys that may be available to the NMCs. Likewise, in some embodiments, the ability to decrypt a portion of the centralized security protocol network traffic may depend on which portion of the centralized security protocol network traffic is being considered.

At block 1210, in one or more of the various embodiments, optionally, the NMC may be arranged to collect one or more cryptographic keys or other secret information that may be included in the network traffic. In some embodiments, NMCs may be arranged to extract one or more additional keys from the decrypted network traffic. For example, in one or more of the various embodiments, an NMC that has access to a client key may employ it to obtain a session key that may be provided by an authentication control server.

Also, in one or more of the various embodiments, NMCs may be arranged to employ protocol information to identify different types of centralized security protocol messages (requests or responses) that are decrypt-able by the NMC. Accordingly, in some embodiments, NMCs may determine if a portion of the centralized security protocol network traffic may be decrypted using the keys or key material available to the NMC.

Further, in some embodiments, NMCs may collect various values or metrics based on the decrypted portions of the centralized security protocol network traffic, including, user-names/IDs, server names/IDs, service names/IDs, time-stamps, key expiration values, key expiration time requests, or the like. In some embodiments, the particular value or metrics may depend on the particular centralized security protocol. Also, in some embodiments, the values or metrics may depend on which optional or extra fields/payloads that may be included in the centralized security protocol network traffic.

Note, this block may be considered optional because in some cases or in some embodiments the NMC may be disabled from collecting one or more keys or one or more secrets because of the absence necessary information or for policy reasons. Likewise, in some cases, the NMC may have already collected some or all of keys or secrets.

At block 1212, in one or more of the various embodiments, the NMC may be arranged to collect other metrics/information associated with the network traffic. In one or more of the various embodiments, NMCs may be arranged to employ rules, patterns, filters, or the like, provided via configuration information to determine the information or metrics that may be collected.

At block 1214, in one or more of the various embodiments, the NMC may be arranged to associate some or all of the collected information with clients, servers, services, or the like, that may be associated with the centralized security protocol network traffic.

Next, in one or more of the various embodiments, control may be returned to a calling process.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for monitoring communication over a network between one or more computers, with one or more network monitoring computers (NMCs) that perform actions, comprising:
    providing a control server that distributes one or more client keys to the one or more computers, wherein the one or more computers are one or more of a client or a resource server; and
    in response to determining network traffic associated with a request from the client to access the resource server, performing further actions, including:
        monitoring a first communication between the client and the control server that authenticates the client with the control server and authenticates the control server with the client, wherein a portion of the first communication is encrypted with a client key associated with the client, and wherein the client is provided an authentication token associated with the control server;
        monitoring a second communication between the client and the control server that includes a request to access the resource server, wherein a portion of the second communication is encrypted with one or more of the client key or the authentication token, and wherein the control server provides an access token to the client that enables the client to access the resource server;
        monitoring other communication between the client and the resource server that includes the access token, wherein one or more portions of the other communication are encrypted with one or more of the access token or one or more other keys derived from one or more of the access token or one or more other portions of the other communication, and wherein the other communication enables the client to access the resource server;
        generating one or more metrics based on the network traffic associated with one or more of the first communication, the second communication, or the other communication;
        correlating the first communication to the second communication with a first portion of the one or more metrics that is based on one or more non-encrypted portions of the network traffic and a second portion of the one or more metrics that is based on one or more other non-encrypted portions of the network traffic; and
        generating one or more reports that include information associated with one or more of the client, the resource server, or the control server.

2. The method of claim 1, further comprising:
    providing the one or more keys to the NMC;
    employing the one or more keys to decrypt one or more portions of one or more of the first communication, the second communication, or the other communication; and
    updating the one or more metrics based on the one or more decrypted portions of the one or more of the first communication, the second communication, or the other communication.

3. The method of claim 1, further comprising:
    providing one or more sharing agents to the one or more computers;
    determining one or more of the client key, the authentication token, or the access token based on information provided by the one or more sharing agents;
    employing the one or more of the client key, the authentication token, or the access token to decrypt one or more portions of one or more of the first communication, the second communication, or the other communication; and
    updating the one or more metrics based on the one or more decrypted portions of the one or more of the first communication, the second communication, or the other communication.

4. The method of claim 1, wherein monitoring the first communication between the client and the control server further comprises:
    generating the first portion of the one or more metrics based on one or more characteristics of the network traffic associated with the first communication; and
    generating the second portion of the one or more metrics based on one or more other characteristics of the network traffic associated with the second communication.

5. The method of claim 1, wherein generating the one or more metrics based on the network traffic associated with the first communication, the second communication, or the other communication, further comprises:
    determining one or more characteristics associated with one or more of the first communication, the second communication, or the other communication based on one or more portions of non-encrypted network traffic, wherein the one or more characteristics include one or more of time of transmission, packet size, latency, source client, target resource server, tuple information, or application protocol;
    determining one or more anomalous characteristics based on one or more values associated with the one or more characteristics, wherein the one or more values exceed one or more threshold values or violate one or more policies, and wherein the one or more anomalous characteristics include one or more of anomalous amount of time for a communication, an anomalous packet size, an anomalous latency, an anomalous source client, an anomalous target resource server, anomalous tuple information, or an anomalous application protocol; and
    updating the one or more metrics based on the one or more anomalous characteristics.

6. The method of claim 1, further comprising:
determining one or more application protocols employed for one or more of the first communication, the second communication, or the other communication based on one or more characteristics of the network traffic associated with the one or more of the first communication, the second communication, or the other communication; and
generating one or more portions of the one or more metrics based on one or more portions of the first communication, the second communication, or the other communication that are included in payload network traffic associated with the one or more application protocols.

7. The method of claim 1, wherein the first communication, the second communication, and the other communication conform to a Kerberos authentication protocol.

8. A processor readable non-transitory storage media that includes instructions for monitoring network traffic using one or more network monitoring computers, wherein execution of the instructions by the one or more networking monitoring computers perform the method comprising:
providing a control server that distributes one or more client keys to the one or more computers, wherein the one or more computers are one or more of a client or a resource server; and
in response to determining network traffic associated with a request from the client to access the resource server, performing further actions, including:
monitoring a first communication between the client and the control server that authenticates the client with the control server and authenticates the control server with the client, wherein a portion of the first communication is encrypted with a client key associated with the client, and wherein the client is provided an authentication token associated with the control server;
monitoring a second communication between the client and the control server that includes a request to access the resource server, wherein a portion of the second communication is encrypted with one or more of the client key or the authentication token, and wherein the control server provides an access token to the client that enables the client to access the resource server;
monitoring other communication between the client and the resource server that includes the access token, wherein one or more portions of the other communication are encrypted with one or more of the access token or one or more other keys derived from one or more of the access token or one or more other portions of the other communication, and wherein the other communication enables the client to access the resource server;
generating one or more metrics based on the network traffic associated with one or more of the first communication, the second communication, or the other communication;
correlating the first communication to the second communication with a first portion of the one or more metrics that is based on one or more non-encrypted portions of the network traffic and a second portion of the one or more metrics that is based on one or more other non-encrypted portions of the network traffic; and
generating one or more reports that include information associated with one or more of the client, the resource server, or the control server.

9. The media of claim 8, further comprising:
providing the one or more keys to the NMC;
employing the one or more keys to decrypt one or more portions of one or more of the first communication, the second communication, or the other communication; and
updating the one or more metrics based on the one or more decrypted portions of the one or more of the first communication, the second communication, or the other communication.

10. The media of claim 8, further comprising:
providing one or more sharing agents to the one or more computers;
determining one or more of the client key, the authentication token, or the access token based on information provided by the one or more sharing agents;
employing the one or more of the client key, the authentication token, or the access token to decrypt one or more portions of one or more of the first communication, the second communication, or the other communication; and
updating the one or more metrics based on the one or more decrypted portions of the one or more of the first communication, the second communication, or the other communication.

11. The media of claim 8, wherein monitoring the first communication between the client and the control server further comprises:
generating the first portion of the one or more metrics based on one or more characteristics of the network traffic associated with the first communication; and
generating the second portion of the one or more metrics based on one or more other characteristics of the network traffic associated with the second communication.

12. The media of claim 8, wherein generating the one or more metrics based on the network traffic associated with the first communication, the second communication, or the other communication, further comprises:
determining one or more characteristics associated with one or more of the first communication, the second communication, or the other communication based on one or more portions of non-encrypted network traffic, wherein the one or more characteristics include one or more of time of transmission, packet size, latency, source client, target resource server, tuple information, or application protocol;
determining one or more anomalous characteristics based on one or more values associated with the one or more characteristics, wherein the one or more values exceed one or more threshold values or violate one or more policies, and wherein the one or more anomalous characteristics include one or more of anomalous amount of time for a communication, an anomalous packet size, an anomalous latency, an anomalous source client, an anomalous target resource server, anomalous tuple information, or an anomalous application protocol; and
updating the one or more metrics based on the one or more anomalous characteristics.

13. The media of claim 8, further comprising:
determining one or more application protocols employed for one or more of the first communication, the second communication, or the other communication based on one or more characteristics of the network traffic associated with the one or more of the first communication, the second communication, or the other communication; and generating one or more portions of the one or more metrics based on one or more portions of the first communication, the second communication, or the other communication that are included in payload network traffic associated with the one or more application protocols.

14. The media of claim 8, wherein the first communication, the second communication, and the other communication conform to a Kerberos authentication protocol.

15. A system for monitoring network traffic in a network:
one or more network monitoring computers (NMCs), comprising:
a memory that stores at least instructions; and
one or more processors that execute instructions that perform actions, including:
providing a control server that distributes one or more client keys to the one or more computers, wherein the one or more computers are one or more of a client or a resource server; and
in response to determining network traffic associated with a request from the client to access the resource server, performing further actions, including:
monitoring a first communication between the client and the control server that authenticates the client with the control server and authenticates the control server with the client, wherein a portion of the first communication is encrypted with a client key associated with the client, and wherein the client is provided an authentication token associated with the control server;
monitoring a second communication between the client and the control server that includes a request to access the resource server, wherein a portion of the second communication is encrypted with one or more of the client key or the authentication token, and wherein the control server provides an access token to the client that enables the client to access the resource server;
monitoring other communication between the client and the resource server that includes the access token, wherein one or more portions of the other communication are encrypted with one or more of the access token or one or more other keys derived from one or more of the access token or one or more other portions of the other communication, and wherein the other communication enables the client to access the resource server;
generating one or more metrics based on the network traffic associated with one or more of the first communication, the second communication, or the other communication;
correlating the first communication to the second communication with a first portion of the one or more metrics that is based on one or more non-encrypted portions of the network traffic and a second portion of the one or more metrics that is based on one or more other non-encrypted portions of the network traffic; and generating one or more reports that include information associated with one or more of the client, the resource server, or the control server; and one or more client computers, comprising:
a memory that stores at least instructions; and
one or more processors that execute instructions that perform actions, including:
providing at least a portion of one or more of the first communication, the second communication, or the other communication.

16. The system of claim 15, wherein the one or more NMC processors execute instructions that perform actions, further comprising:
providing the one or more keys to the NMC;
employing the one or more keys to decrypt one or more portions of one or more of the first communication, the second communication, or the other communication; and
updating the one or more metrics based on the one or more decrypted portions of the one or more of the first communication, the second communication, or the other communication.

17. The system of claim 15, wherein the one or more NMC processors execute instructions that perform actions, further comprising:
providing one or more sharing agents to the one or more computers;
determining one or more of the client key, the authentication token, or the access token based on information provided by the one or more sharing agents;
employing the one or more of the client key, the authentication token, or the access token to decrypt one or more portions of one or more of the first communication, the second communication, or the other communication; and
updating the one or more metrics based on the one or more decrypted portions of the one or more of the first communication, the second communication, or the other communication.

18. The system of claim 15, wherein monitoring the first communication between the client and the control server further comprises:
generating the first portion of the one or more metrics based on one or more characteristics of the network traffic associated with the first communication; and
generating the second portion of the one or more metrics based on one or more other characteristics of the network traffic associated with the second communication.

19. The system of claim 15, wherein generating the one or more metrics based on the network traffic associated with the first communication, the second communication, or the other communication, further comprises:
determining one or more characteristics associated with one or more of the first communication, the second communication, or the other communication based on one or more portions of non-encrypted network traffic, wherein the one or more characteristics include one or more of time of transmission, packet size, latency, source client, target resource server, tuple information, or application protocol;
determining one or more anomalous characteristics based on one or more values associated with the one or more characteristics, wherein the one or more values exceed one or more threshold values or violate one or more policies, and wherein the one or more anomalous characteristics include one or more of anomalous amount of time for a communication, an anomalous packet size, an anomalous latency, an anomalous source client, an anomalous target resource server, anomalous tuple information, or an anomalous application protocol; and updating the one or more metrics based on the one or more anomalous characteristics.

20. The system of claim 15, wherein the one or more NMC processors execute instructions that perform actions, further comprising:

determining one or more application protocols employed for one or more of the first communication, the second communication, or the other communication based on one or more characteristics of the network traffic associated with the one or more of the first communication, the second communication, or the other communication; and generating one or more portions of the one or more metrics based on one or more portions of the first communication, the second communication, or the other communication that are included in payload network traffic associated with the one or more application protocols.

21. The system of claim 15, wherein the first communication, the second communication, and the other communication conform to a Kerberos authentication protocol.

22. A network monitoring computer (NMC) for monitoring network traffic between one or more computers, comprising:

a memory that stores at least instructions; and one or more processors that execute instructions that perform actions, including:

providing a control server that distributes one or more client keys to the one or more computers, wherein the one or more computers are one or more of a client or a resource server; and in response to determining network traffic associated with a request from the client to access the resource server, performing further actions, including:

monitoring a first communication between the client and the control server that authenticates the client with the control server and authenticates the control server with the client, wherein a portion of the first communication is encrypted with a client key associated with the client, and wherein the client is provided an authentication token associated with the control server;

monitoring a second communication between the client and the control server that includes a request to access the resource server, wherein a portion of the second communication is encrypted with one or more of the client key or the authentication token, and wherein the control server provides an access token to the client that enables the client to access the resource server;

monitoring other communication between the client and the resource server that includes the access token, wherein one or more portions of the other communication are encrypted with one or more of the access token or one or more other keys derived from one or more of the access token or one or more other portions of the other communication, and wherein the other communication enables the client to access the resource server;

generating one or more metrics based on the network traffic associated with one or more of the first communication, the second communication, or the other communication;

correlating the first communication to the second communication with a first portion of the one or more metrics that is based on one or more non-encrypted portions of the network traffic and a second portion of the one or more metrics that is based on one or more other non-encrypted portions of the network traffic; and generating one or more reports that include information associated with one or more of the client, the resource server, or the control server.

23. The NMC of claim 22, wherein the one or more processors execute instructions that perform actions, further comprising:

providing the one or more keys to the NMC;

employing the one or more keys to decrypt one or more portions of one or more of the first communication, the second communication, or the other communication; and updating the one or more metrics based on the one or more decrypted portions of the one or more of the first communication, the second communication, or the other communication.

24. The NMC of claim 22, wherein the one or more processors execute instructions that perform actions, further comprising:

providing one or more sharing agents to the one or more computers;

determining one or more of the client key, the authentication token, or the access token based on information provided by the one or more sharing agents;

employing the one or more of the client key, the authentication token, or the access token to decrypt one or more portions of one or more of the first communication, the second communication, or the other communication; and updating the one or more metrics based on the one or more decrypted portions of the one or more of the first communication, the second communication, or the other communication.

25. The NMC of claim 22, wherein monitoring the first communication between the client and the control server further comprises:

generating the first portion of the one or more metrics based on one or more characteristics of the network traffic associated with the first communication; and generating the second portion of the one or more metrics based on one or more other characteristics of the network traffic associated with the second communication.

26. The NMC of claim 22, wherein generating the one or more metrics based on the network traffic associated with the first communication, the second communication, or the other communication, further comprises:

determining one or more characteristics associated with one or more of the first communication, the second communication, or the other communication based on one or more portions of non-encrypted network traffic, wherein the one or more characteristics include one or more of time of transmission, packet size, latency, source client, target resource server, tuple information, or application protocol;

determining one or more anomalous characteristics based on one or more values associated with the one or more characteristics, wherein the one or more values exceed one or more threshold values or violate one or more policies, and wherein the one or more anomalous characteristics include one or more of anomalous amount of time for a communication, an anomalous packet size, an anomalous latency, an anomalous source client, an anomalous target resource server, anomalous tuple information, or an anomalous application protocol; and updating the one or more metrics based on the one or more anomalous characteristics.

27. The NMC of claim 22, wherein the one or more processors execute instructions that perform actions, further comprising:

determining one or more application protocols employed for one or more of the first communication, the second communication, or the other communication based on one or more characteristics of the network traffic associated with the one or more of the first communication, the second communication, or the other communication; and generating one or more portions of the one or more metrics based on one or more portions of the first communication, the second communication, or the other communication that are included in payload network traffic associated with the one or more application protocols.

28. The NMC of claim 22, wherein the first communication, the second communication, and the other communication conform to a Kerberos authentication protocol.

* * * * *